United States Patent
Sugawara et al.

(10) Patent No.: US 8,071,243 B2
(45) Date of Patent: Dec. 6, 2011

(54) FUEL CELL SYSTEM

(75) Inventors: Yasushi Sugawara, Osaka (JP); Takayuki Urata, Hyogo (JP); Takahiro Umeda, Nara (JP); Akihiko Yoshida, Osaka (JP); Soichi Shibata, Osaka (JP); Junji Morita, Osaka (JP)

(73) Assignee: Panasonic Corporation, Osaka (JP)

( * ) Notice: Subject to any disclaimer, the term of this patent is extended or adjusted under 35 U.S.C. 154(b) by 851 days.

(21) Appl. No.: 12/095,829

(22) PCT Filed: Nov. 28, 2006

(86) PCT No.: PCT/JP2006/323663
§ 371 (c)(1),
(2), (4) Date: Jun. 2, 2008

(87) PCT Pub. No.: WO2007/063826
PCT Pub. Date: Jun. 7, 2007

(65) Prior Publication Data
US 2009/0047555 A1 Feb. 19, 2009

(30) Foreign Application Priority Data
Dec. 2, 2005 (JP) .................................. 2005-348768

(51) Int. Cl.
*H01M 8/04* (2006.01)
(52) U.S. Cl. ......... 429/429; 429/428; 429/443; 429/446
(58) Field of Classification Search .................. None
See application file for complete search history.

(56) References Cited

U.S. PATENT DOCUMENTS

| 5,013,617 A * | 5/1991 | Scheffler ........................ 429/410 |
| 5,419,978 A * | 5/1995 | Landau .......................... 429/410 |
| 2003/0068540 A1 | 4/2003 | Ueda et al. |

FOREIGN PATENT DOCUMENTS

| JP | 8-190929 | 7/1996 |
| JP | 2001-332281 | 11/2001 |
| JP | 2003-303608 | 10/2003 |
| JP | 2005-222707 | 8/2005 |
| JP | 2005-267910 | 9/2005 |

OTHER PUBLICATIONS

Translation of JP 08-190929 (publication date Jul. 23, 1996).*

* cited by examiner

*Primary Examiner* — Cynthia Lee
(74) *Attorney, Agent, or Firm* — McDermott Will & Emery LLP

(57) ABSTRACT

In a fuel cell system, during the state where the fuel cell system is not generating an electric power, a fuel gas passage and an oxidizing gas passage are closed, and an inert gas supply device (54, 58) supplies an inert gas to an anode space (111) which is substantially isolated from outside, the anode space including the closed fuel gas passage and a space connected to the closed fuel gas passage, while an air supply device (67, 70) supplies air to a cathode space (112) which is substantially isolated from outside, the cathode space including the closed oxidizing gas passage and a space connected to the closed oxidizing gas passage. With this, the fuel cell system is capable of achieving high energy efficiency and of surely preventing degradation of electrodes during the state where the fuel cell system is not generating the electric power, irrespective of repeated start-up and stop.

16 Claims, 12 Drawing Sheets

FUEL CELL SYSTEM

RELATED APPLICATIONS

This application is the U.S. National Phase under 35 U.S.C. §371 of International Application No. PCT/JP2006/323663, filed on Nov. 28, 2006, which in turn claims the benefit of Japanese Application No. 2005-348768, filed on Dec. 2, 2005, the disclosures of which Applications are incorporated by reference herein.

TECHNICAL FIELD

The present invention relates to a fuel cell system. More particularly, the present invention relates to a fuel cell system capable of preventing degradation of electrodes due to repeated start-up and stop.

BACKGROUND ART

In home fuel cell systems, it is desirable to carry out a DSS (Daily Start & Stop or Daily Start-up & Shut-down) operation in which the operation of the fuel cell system is carried out during daytime and is stopped during midnight so that electricity and heating expenses are reduced and carbon dioxide is effectively reduced. In the DSS operation, the operation of the fuel cell system is frequently stopped. In the conventional fuel cell system, such an operation arises a problem that electrocatalyst is degraded due to reaction gases remaining within a stack or air entering from outside during a state where the fuel cell system is not generating an electric power and hence performance of a fuel cell is deteriorated.

As a fuel cell system which was made to solve such a problem, for example, there is a fuel cell system in which, in a start-up state, a means for consuming an electric power is internally connected in a time period before an external load is connected to the system so that occurrence of an open circuit potential is prevented (see patent document 1). Also, there is a fuel cell system equipped therein with an electric discharge means for suppressing an open circuit voltage (see patent document 2). Also, there is a fuel cell system in which performance of a cathode electrode is improved by using hydrogen that leaks from an anode to a cathode (see patent document 3). Also, there is a fuel cell system in which a gas discharged from a cathode is re-circulated into the cathode to consume oxygen, thereby improving durability (see patent document 4). Also, there is a fuel cell system in which power generation is carried out in a state where gas supply is stopped to consume reaction gases remaining within a fuel cell, thereby decreasing electrode potential (see patent document 5). Also, there is a fuel cell system in which a fuel cell is activated while supplying a hydrogen-containing fuel to an anode, thereby decreasing a cathode potential (see patent document 6).

Patent document 1: Japanese Laid-Open Patent Application Publication No. Hei. 5-251101
Patent document 2: Japanese Laid-Open Patent Application Publication No. Hei. 8-222258
Patent document 3: Japanese Laid-Open Patent Application Publication No. 2000-260454
Patent document 4: Japanese Laid-Open Patent Application Publication No. 2003-115317
Patent document 5: Japanese Laid-Open Patent Application Publication No. 2004-186137
Patent document 6: Japanese Laid-Open Patent Application Publication No. 2003-536232

DISCLOSURE OF THE INVENTION

Problems to be Solved by the Invention

However, in the above described conventional configurations, there still exists a problem that degradation of the electrodes cannot be always surely prevented during the state where the fuel cell system is not generating the electric power. Whereas hydrogen is consumed to restore the electrodes in the fuel cell system disclosed in the patent document 3, energy is wastefully consumed to generate hydrogen, reducing efficiency as a whole.

The present invention has been made to solve the above described problems, and an object of the present invention is to provide a fuel cell system which is capable of achieving high energy efficiency and of surely preventing degradation of an electrode during the state where the fuel cell system is not generating an electric power, even when the fuel cell system repeats start-up and stop.

Means for Solving the Problem

How the Invention was Conceived

The present inventors intensively studied a method of preventing degradation of the electrodes during the state where the fuel cell system is not generating the electric power. As a result, they found the following.

In order to enable the electrodes of the fuel cell to perform a power generation reaction stably over a long time period, it is required that a state of an interface between a polymer electrolyte and the electrode be maintained over the long time period. In polymer electrolyte fuel cells which use hydrogen and oxygen as reaction species, a theoretical value of an open circuit voltage is +1.23V. An actual open circuit voltage is in a range of about +0.93V to +1.1V due to influences of impurities or adsorbing species present at an anode or a cathode. A voltage drop occurs due to dispersion of hydrogen and oxygen in the electrolyte membrane. The anode potential is substantially equal to that of hydrogen electrode unless extreme dissolution of impurities such as metal species takes place, and so, the potential of vs. Standard Hydrogen Electrode (vs. SHE) is approximately zero. Therefore, the open circuit voltage is substantially equal to the cathode potential (vs. SHE). It is considered that the cathode potential (vs. SHE) is susceptible to the adsorbing species present at the cathode, and is hybrid potential in chemical reactions represented by (formula 1) to (formula 5) (see Reference Document: H. Wroblowa, et al., J. Electroanal. Chem., 15, p 139 to 150 (1967), "Adsorption and Kinetics at Platinum Electrodes in The Presence of Oxygen at Zero Net Content")). Oxidization of Pt takes place as represented by (formula 4) if the electrode potential is above +0.88V (vs. SHE). If the oxidization of Pt takes place, then catalytic activity of Pt deteriorates, and Pt is dissolved from the electrode into water. The prior arts (e.g., Patent document 1, Patent document 2) disclose a method of preventing occurrence of the open circuit, but do not disclose that the potential of each electrode is made +0.88V or lower.

 $O_2 + 4H^+ + 4e^- \leftrightarrows 2H_2O$ +1.23V (chemical formula 1)

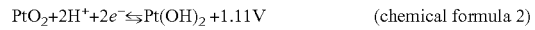 $PtO_2 + 2H^+ + 2e^- \leftrightarrows Pt(OH)_2$ +1.11V (chemical formula 2)

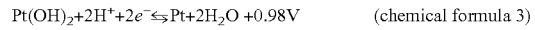 $Pt(OH)_2 + 2H^+ + 2e^- \leftrightarrows Pt + 2H_2O$ +0.98V (chemical formula 3)

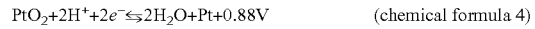 $PtO_2 + 2H^+ + 2e^- \leftrightarrows 2H_2O + Pt$ +0.88V (chemical formula 4)

 $O_2 + 2H^+ + 2e^- \leftrightarrows H_2O_2$ +0.68V (chemical formula 5)

In order to protect the electrodes, the anode or the cathode may be purged using water or a humidified inert gas. But, this is not intended to maintain the potential (vs. SHE) of each electrode to a certain value or lower. Even if the inert gas is filled in the interior of the cell, the potential of the anode and the potential of the cathode are unable to be decreased positively. Even if the inert gas has been used for replacement, oxygen gradually enters from outside because pipe connecting portions and the like are commonly incompletely sealed, so that both of the electrodes have voltages in a range of about +0.93V to +1.1 V (vs. SHE). If the potential rises, then the electrode is oxidized or dissolved and thus its performance deteriorates. To prevent degradation of the electrodes, it is necessary to surely decrease their potentials.

To consume oxygen at the cathode, power generation may be carried out in a state where gas supply to the cathode is stopped or while re-circulating the gas in the cathode and while supplying the hydrogen-containing gas to the anode (e.g., patent document 3, patent document 4, patent document 5). This method arises a need for continued operation of a hydrogen generator until complete stop, or for a power generation system equipped with hydrogen infrastructure. Such a configuration is limited to practices for special uses, and causes a significant increase in hydrogen which is not consumed for power generation, reducing energy efficiency. It is therefore desirable to protect the electrodes without reducing energy efficiency.

Similar effects can be achieved even in the state where supply of hydrogen is stopped. In that case, however, the pressure in an anode space is reduced to a great degree. This arises a problem that oxygen enters from outside, a polymer electrolyte membrane is damaged, or electrical short between the electrodes occurs. Such a problem can be solved by preventing the pressure decrease in the interior of the fuel cell.

The operation of fuel cell system may be stopped while replacing an oxidizing gas (oxygen-containing gas) at the cathode with the inert gas, holding a fuel gas (hydrogen-containing gas) at the anode, and maintaining the potential of each electrode at a lower level. In this method, in the start-up state, it is necessary to treat the inert gas held at the cathode during the stop state. When nitrogen or the like is used as the inert gas, a nitrogen infrastructure (cylinder, etc) is needed. It is desirable to protect the electrodes during the state where the fuel cell system is not generating the electric power, using a simplest possible configuration.

Based on the above mentioned study, the present inventors conceived that after stop of power generation in the fuel cell, a material gas is supplied to the anode and air is supplied to the cathode to make up for pressure decrease in the cathode and pressure decrease in the anode, according to the pressure decrease in the interior of the fuel cell.

(Configuration of the Present Invention)

A fuel cell system of the present invention comprises a fuel cell including a polymer electrolyte membrane, and an anode and a cathode which sandwich the polymer electrolyte membrane; a fuel gas passage through which a fuel gas is supplied to the anode and is discharged from the anode; an oxidizing gas passage through which an oxidizing gas is supplied to the cathode and is discharged from the cathode; an inert gas supply device which supplies an inert gas to the fuel gas passage; and an air supply device which supplies air to the oxidizing gas passage; wherein the fuel gas passage and the oxidizing gas passage are closed during a state where the fuel cell system is not generating an electric power; wherein the inert gas supply device is configured to supply the inert gas to an anode space which is substantially isolated from outside, the anode space including the closed fuel gas passage and a space connected to the closed fuel gas passage, during the state where the fuel cell system is not generating the electric power; and wherein the air supply device is configured to supply the air to a cathode space which is substantially isolated from outside, the cathode space including the closed oxidizing gas passage and a space connected to the closed oxidizing gas passage, during the state where the fuel cell system is not generating the electric power.

When the power generation is stopped, the fuel gas passage and the oxidizing gas passage are closed. The closing means may be any devices such as valves or gates. Depending on supply devices (e.g., pumps) for the fuel gas and the oxidizing gas, the passages may be closed by the stopped supply devices.

The phrase "an anode space which is substantially isolated from outside, the anode space including the closed fuel gas passage and a space connected to the closed fuel gas passage" refers to, for example, a passage for the fuel gas which is comprised of an anode side passage in the interior of the cell of the fuel cell and having both ends sealed, and passages connected to the interior of the closed passage and sealed from outside. The anode space is substantially isolated (sealed) from outside and is configured not to permit gas flow between the anode space and an outside space of the passages unless the anode space is unsealed.

The phrase "a cathode space which is substantially isolated from outside, the cathode space including the closed oxidizing gas passage and a space connected to the closed oxidizing gas passage" refers to, for example, a passage for the oxidizing gas which is comprised of a cathode side passage in the interior of the cell of the fuel cell and having both ends sealed, and passages connected to the interior of the closed passage and sealed from outside. The cathode space is substantially isolated (sealed) from outside and is configured not to permit gas flow between the cathode space and an outside space of the passages unless the cathode space is unsealed.

Under a normal condition, the pressure decreases in the anode space and in the cathode space, because of gas consumption due to, for example, cross leak, or temperature decrease. In accordance with the above described configuration, the inert gas is supplied to the anode space and the air is supplied to the cathode space so that the pressure is not decreased in the anode space and in the cathode space. In the cathode space, oxygen is consumed and only nitrogen remains, and therefore the electrode potential can be suppressed to a low one. Since the gases are supplied to the interior of the fuel cell to make up for the pressure decrease, pressure difference between the interior of the fuel cell and atmosphere is not generated, making it possible to minimize the entry of oxygen into the anode space. Since the entry of oxygen is prevented, an increase in the electrode potential is more effectively suppressed. The potential (vs. SHE) of each electrode can be maintained at +0.88V or lower so that degradation of the electrode can be surely prevented.

The prevention of the pressure decrease may lead to the prevention of damage to the polymer electrolyte membrane or electrical short between the electrodes. It is not necessary to supply hydrogen to the anode space and to the cathode space. Since it is not necessary to operate the hydrogen generator or consume hydrogen supplied from the hydrogen infrastructure during the state where the fuel cell system is not generating the electric power, enabling achievement of high energy efficiency. Since a special cylinder or the like for purging the cathode space with the inert gas is omitted, a configuration can be advantageously simplified. It should be noted that the present invention is useful in the configuration in which the inert gas is supplied from the cylinder.

The fuel cell system of the present invention may further comprise a gas purifier which purifies a material gas; and a hydrogen generator which generates the fuel gas from the material gas. The inert gas may be the material gas which has been purified in the gas purifier.

In such a configuration, since the material gas is used as the inert gas, the cylinder or the like may be omitted. This makes it possible to effectively reduce the size of the system and improve efficiency. Since the impurities contained in the material gas are removed by the gas purifier, degradation of the electrodes due to the impurities can be prevented.

In the fuel cell system of the present invention, the anode space may have a volume larger than a volume of the cathode space. Also, the anode space and the cathode space respectively may have volumes set so that a reducing agent is more in amount than an oxidizing agent in a space which is a sum of the anode space and the cathode space, under a condition in which temperature of the fuel cell system is stabilized after power generation is stopped. The anode space may have a volume which is not smaller than a volume of the cathode space and is not larger than three times as large as the volume of the cathode space.

In such a configuration, in the operation stop state, the reducing agent (e.g., hydrogen) reacts with the oxidizing agent (e.g., oxygen) in the interior of the fuel cell. As a result, all of the oxidizing agent is consumed and the reducing agent remains in the interior of the fuel cell. This makes it possible to surely prevent increase in the electrode potential and degradation of the electrodes.

The fuel cell system may further comprise a buffer unit provided in the anode space.

In such a configuration, the buffer unit is able to store the fuel gas so that the reducing agent (e.g., hydrogen) can be made sufficient in amount in the anode space. Therefore, the reducing agent can be easily made more in amount than the oxidizing agent in the interior of the fuel cell under the state where the fuel cell system is not generating the electric power.

The fuel cell system of the present invention may further comprise a controller; a first on-off valve which is provided to be able to open and close a supply side of the fuel gas passage; a second on-off valve which is provided to be able to open and close a discharge side of the fuel gas passage; a third on-off valve which is provided to be able to open and close a supply side of the oxidizing gas passage; and a fourth on-off valve which is provided to be able to open and close a discharge side of the oxidizing gas passage. The controller may be configured to cause the first on-off valve and the second on-off valve to be closed to close the fuel gas passage during the state where the fuel cell system is not generating the electric power. The controller may be configured to cause the third on-off valve and the fourth on-off valve to be closed to close the oxidizing gas passage during the state where the fuel cell system is not generating the electric power.

In such a configuration, the on-off valves provided in the fuel gas passage and the oxidizing gas passage are able to simply and easily close the associated passages.

The fuel cell system of the present invention may further comprise a controller. The inert gas supply device may include a fifth on-off valve. The air supply device may include a sixth on-off valve. The controller may be configured to cause the fifth on-off valve to be opened and closed to control supply of the inert gas to the anode space during the state where the fuel cell system is not generating the electric power. The controller may be configured to cause the sixth on-off valve to be opened and closed to control supply of the air to the cathode space during the state where the fuel cell system is not generating the electric power.

In such a configuration, the controller is able to simply and easily control the supply of the inert gas to the anode space and the supply of the air to the cathode space by opening and closing the on-off valves.

The fuel cell system of the present invention may further comprise a controller; and a pressure detector configured to directly or indirectly detect a pressure in the anode space or a pressure in the cathode space. The controller may be configured to control supply of the inert gas from the inert gas supply device to the anode space and supply of the air from the air supply device to the cathode space, based on a detection result of the pressure detector, during the state where the fuel cell system is not generating the electric power.

In such a configuration, the supply of the inert gas to the anode space and the supply of the air to the cathode space can be controlled based on the pressure in the anode space or the pressure in the cathode space which has been actually detected. Therefore, the pressure decrease in the anode space and the pressure decrease in the cathode space can be prevented surely.

In the fuel cell system of the present invention, the controller may be configured to control the inert gas supply device to supply the inert gas to the anode space until an anode space pressure which is a pressure in an interior of the anode space substantially becomes equal to a supply pressure of the inert gas, when the anode space pressure is a first pressure or more lower than the supply pressure of the inert gas. The controller may be configured to control the air supply device to supply the air to the cathode space until a cathode space pressure which is a pressure in an interior of the cathode space substantially becomes equal to an ambient pressure, when the cathode space pressure is a second pressure or more lower than the ambient pressure.

Or, the controller may be configured to control the inert gas supply device to supply the inert gas to the anode space until an anode space pressure which is a pressure in an interior of the anode space substantially becomes equal to a supply pressure of the inert gas, when the anode space pressure is a first pressure or more lower than an ambient pressure. The controller may be configured to control the air supply device to supply the air to the cathode space until a cathode space pressure which is a pressure in an interior of the cathode space substantially becomes equal to an ambient pressure, when the cathode space pressure is a second pressure or more lower than the ambient pressure.

Or, the controller may be configured to control the inert gas supply device to supply the inert gas to the anode space until an anode space pressure which is a pressure in an interior of the anode space substantially becomes equal to a supply pressure of the inert gas, when the anode space pressure is a first pressure or more lower than a standard atmospheric pressure. The controller may be configured to control the air supply device to supply the air to the cathode space until a cathode space pressure which is a pressure in an interior of the cathode space substantially becomes equal to an ambient pressure, when the cathode space pressure is a second pressure or more lower than the standard atmospheric pressure.

In such a configuration, the supply of the inert gas to the anode space and the supply of the air to the cathode space can be controlled, based on the pressure difference between the pressure in the anode space or the pressure in the cathode space and the pressure in the outside space. Therefore, entry of undesired air into the anode space and the cathode space can be surely prevented.

In the fuel cell system of the present invention, the first pressure and the second pressure may be each set to a value not lower than 5 kPa and not higher than 20 kPa.

In such a configuration, since the pressure difference does not become too large, a large burden is not placed on a sealing part of an apparatus. As a result, the life of the apparatus can be increased.

The fuel cell system of the present invention may further comprise a controller; and a temperature detector which directly or indirectly detects a temperature of the anode space or a temperature of the cathode space. The controller may be configured to control supply of the inert gas to the anode space and supply of the air to the cathode space, based on a detection result of the temperature detector, during the state where the fuel cell system is not generating the electric power.

In such a configuration, the supply of the inert gas to the anode space and the supply of the air to the cathode space can be controlled based on the temperature of the anode space or the temperature of the cathode space. Since it is not necessary to detect the pressures, the configuration of the system can be simplified.

The controller of the present invention may be configured to control the inert gas supply device to supply the inert gas to the anode space and to control the air supply device to supply the air to the cathode space, every time the detection result of the temperature detector decreases by a first temperature difference. The first temperature difference may be not smaller than 5° C. and not larger than 20° C.

In such a configuration, since the gases are supplied every time the temperature of the anode space and the temperature of the cathode space decrease by a predetermined temperature, the control becomes easier.

The fuel cell system of the present invention may further comprise a controller; and a timer which measures a time period that lapses after power generation is stopped. The controller may be configured to control supply of the inert gas to the anode space and supply of the air to the cathode space, based on a measurement result of the timer, after power generation is stopped.

In such a configuration, since the gases are supplied to the anode space and to the cathode space based on the time period that lapses after the stop of the power generation, the control becomes much easier.

In the fuel cell system of the present invention, the hydrogen generator may include a burner. The hydrogen generator may be configured such that the burner combusts a gas guided from an interior of the anode space to the burner in a start-up state.

In such a configuration, since the material gas supplied to the anode space is not released to air without being processed, safety is improved. In addition, since the material gas supplied to the anode space is used to increase the temperature of the hydrogen generator, energy efficiency is improved.

The above object, other objects, features, and advantages of the present invention will be apparent by the following detailed description of preferred embodiment of the inventions, with reference to the accompanying drawings.

Effects of the Invention

The present invention has the above described configuration, and achieves the following effects. That is, the fuel cell system can be provided, which is capable of achieving high energy efficiency and is capable of surely preventing degradation of electrodes during a state where the fuel cell system is not generating an electric power, even when the fuel cell system repeats start-up and stop.

Figure 1:
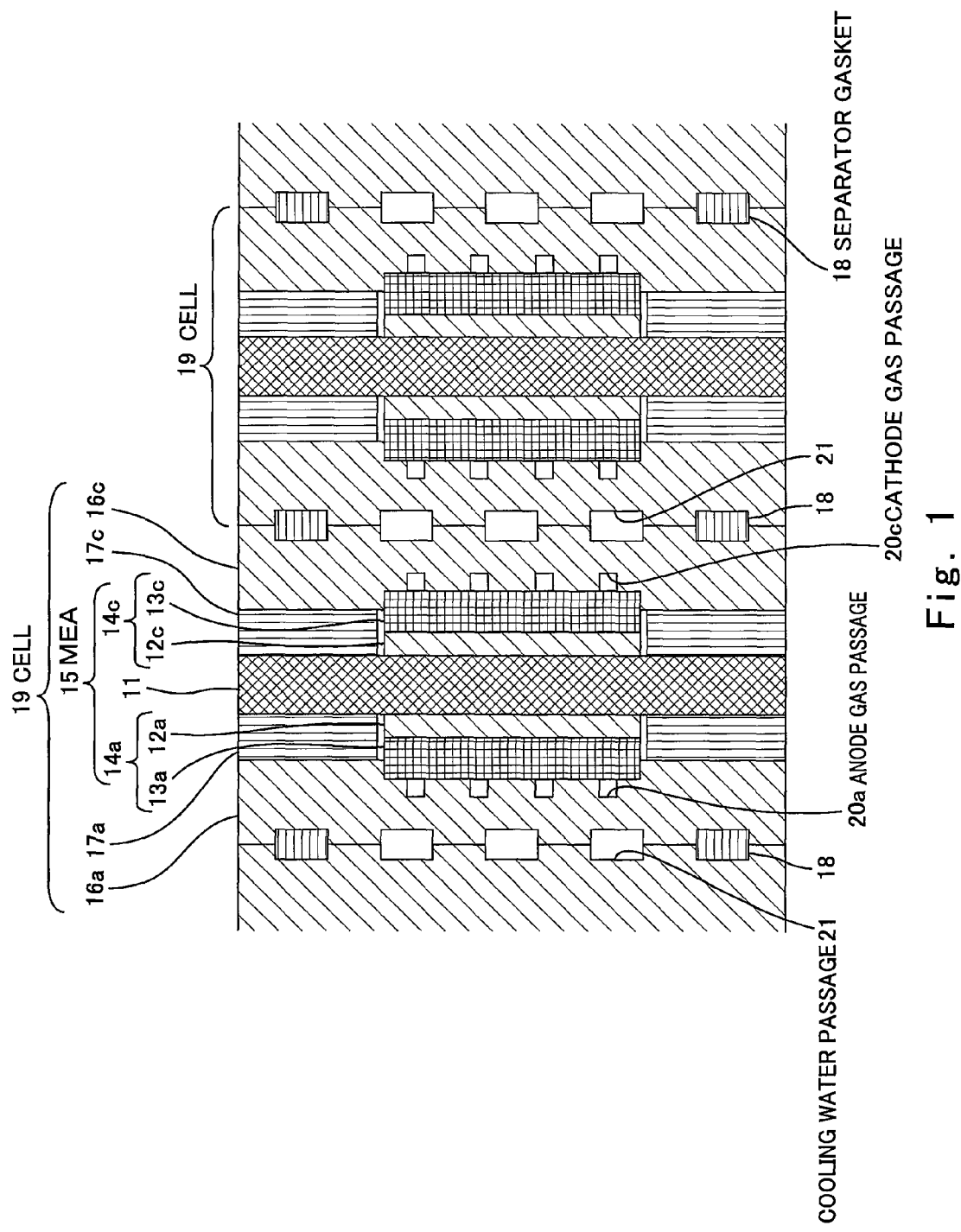
FIG. 1 is a view showing an example of a schematic configuration of an internal structure of a polymer electrolyte fuel cell according to an embodiment 1 of the present invention.

DESCRIPTION OF REFERENCE NUMERALS 11 polymer electrolyte membrane
12 catalyst layer
13 gas diffusion layer
14 electrode
15 MEA
16 electrically-conductive separator
17 MEA gasket
18 separator gasket
19 cell
20a anode gas passage
20c cathode gas passage
21 cooling water passage
30 fuel cell
31 current collecting plate
32 insulating plate
33 end plate
40 fuel cell system
41 gas purifier
42 hydrogen generator
43 burner
44 blower
45 filter
46 humidifier
47 pump
48 outer casing
49 controller
50 input/output device
51 unpurified material gas supply pipe
52 on-off valve
53 purified material gas supply pipe
54 purified material gas bypass pipe
55 fuel gas supply pipe 56 on-off valve
57 fuel gas bypass pipe
58 on-off valve
59a anode space pressure detector
59c cathode space pressure detector
60 off gas pipe
61 on-off valve
62 on-off valve
63 combustion exhaust gas discharge pipe
64 oxidized gas intake pipe
65 unpurified oxidizing gas supply pipe
67 purified oxidizing gas bypass pipe
68 humidified oxidizing gas supply pipe
69 on-off valve
70 on-off valve
71 oxidizing gas discharge pipe
72 on-off valve
73 exhaust oxidizing gas discharge pipe
74 cooling water intake pipe
75 cooling water supply pipe
76 cooling water discharge pipe
77 cooling water re-supply pipe
80 control unit
81 memory
82 timer
90 buffer unit
91 buffer unit
92 buffer unit
93 air supply pipe
94 temperature detector
95 electric power circuit unit
96 voltage measuring unit
97 anode side gas passage
98 cathode side gas passage
100 fuel cell system
101 fuel cell system
102 fuel cell system
103 fuel cell system
104 fuel cell system
111 anode space
112 cathode space

BEST MODE FOR CARRYING OUT THE INVENTION

Hereinafter, a principle and preferred embodiments of the present invention will be described with reference to the accompanied drawings.
(Principle of the Present Invention)

First of all, the principle of the present invention will be described.

After the operation of a fuel cell is stopped, the temperature of the fuel cell gradually decreases. In the interior of the fuel cell, cross leak of reaction gases via a polymer electrolyte membrane occurs. When the cross leak occurs, hydrogen in an anode space and oxygen in a cathode space react with each other and are consumed, generating water. Also, hydrogen and oxygen are sometimes consumed due to self-discharge, etc. Because of the temperature decrease and the consumption of the reaction gases, the pressure in the interior of the fuel cell decreases.

Pay attention to anode side. The anode space basically contains plenty of hydrogen and is in a reduction atmosphere. An inert gas, which is incapable of decreasing the electrode potential, is supplied to reduce a pressure difference between the anode space and an outside space, thereby obviating a risk that oxygen in air enters and increase the potential. Pay attention to cathode side. The cathode space is basically in an oxidization atmosphere because of the presence of oxygen derived from air. If the cathode space is isolated from an outside space, oxygen remaining within the cathode space reacts with hydrogen derived from the anode to generate water, so that a gas other than oxygen, such as nitrogen, remains there. Air contains as major components oxygen and nitrogen. By selectively consuming only oxygen, nitrogen can be filled in the cathode space. Since nitrogen does not substantially affect the electrode potential unlike oxygen, an increase in the electrode potential can be prevented. Actually, a tester machine was assembled and was caused to carry out the described operation, and the electrode potential was measured. As a result, it was found out that the potential (vs. SHE) of the anode and the potential (vs. SHE) of the cathode were maintained surely at +0.88V or lower.

In such a configuration, the electrode potential can be surely decreased and thereby degradation of the electrodes is prevented. A special cylinder or the like for purging the cathode space with the inert gas may be omitted, and thus a configuration can be simplified. Since the gas with the amount for making up for the pressure decrease is supplied both to the anode space and to the cathode space, there is not generated a pressure difference between these spaces and atmosphere, so that an amount of entry of oxygen can be minimized. By preventing the pressure decrease, damage to the polymer electrolyte membrane or electrical short between the electrodes can be prevented. Since it is not necessary to supply hydrogen to the anode space and to the cathode space, it is not necessary to operate the hydrogen generator and to consume hydrogen supplied from hydrogen infrastructure during a state where the fuel cell system is not generating the electric power, enabling achievement of high energy efficiency.

To surely decrease the potentials of the electrodes to lower than +0.88V (vs. SHE), it is desired that a reducing agent (e.g., hydrogen) be more in amount than an oxidizing agent (e.g., oxygen) in the interior (in the vicinity of the electrodes) of the fuel cell. A simple way to make hydrogen more in amount than oxygen is to make the anode space larger in volume than the cathode space. The ratio between the volumes varies depending on the temperature or composition of the gases supplied to the anode and to the cathode (including a partial pressure of steam), the temperature in a power generation state or in an operation stop state, etc. Typically, the volumes can be calculated according to the following formulae. In the calculation below, it is assumed that gases comply with ideal gas equations, for the sake of simplicity.

In actual calculation of the volumes, attention should be paid to the fact that the amount of substances in the interior of the anode space and in the interior of the cathode space fluctuate due to gas supply from outside. The volume decreases as the temperature decreases under the condition in which the amount of substances and the pressure are constant. If the gases are consumed through the reaction, the volume decreases. Consider a case where, after stop of the power generation, the temperature of the fuel cell decreases and the fuel cell is in a stable state (operation stop state). It is assumed that the temperature of the interior of the fuel cell in the operation stop state is a room temperature (e.g., 25° C.). Typically, the oxidizing gas (gas supplied to the cathode: air) is humidified up to a saturated water vapor pressure during the operation. Therefore, in the operation stop state, a relative humidity is 100%. Since it is necessary that oxygen in air have been consumed, a substantially all components other than steam is nitrogen. When the amount of substance of nitrogen is $n_{25}$ (mol), the amount of all substances is $c_{25}$ (mol), a partial pressure ratio of steam is $PW_{25}$ (calculated from the saturated water vapor pressure at 25° C.) in the cathode space in the operation stop state, the following formula is established.

$$n_{25}=c_{25}\times(1-PW_{25})$$

When it is assumed that all of nitrogen is derived from air, a total of the amount of substance of air present in the cathode space during the operation and the amount of substance of air to be supplied to the cathode space after the stop of power generation is c (mol), and a partial pressure ratio of nitrogen in air is PN, the following formula is established.

$$c=n_{25}\div PN$$

When the amount of oxygen to be consumed in the cathode space is o (mol) and a partial pressure ratio of oxygen in air is PO, the following formula is established.

$$o=c\times PO$$

Assuming that oxygen to be consumed and hydrogen supplied to the anode react with each other completely, the following formula is established when the amount of substance of hydrogen to be supplied to the anode is h (mol).

$$h=o\times 2$$

That is, it is required that at least h (mol) of hydrogen be present in the anode space in the stop state of power generation (immediately after the stop of power generation). This result was obtained on assumption that hydrogen was not supplied to the anode space at all after the stop of power generation and a material gas (e.g., city gas such as 13A gas) made up for the pressure decrease. The gases (anode gases) in the anode space in the operation state mainly includes hydrogen, steam, and carbon dioxide. When the temperature of the anode gas is, for example, 70° C., a partial pressure ratio of hydrogen in the anode gas is $PH_{70}$, and the amount of all substances in the anode space is $a_{70}$ (mol) in the power generation state, the following formula is established.

$$a_{70}=h\div PH_{70}$$

From the above results, a mol ratio in amount of all substances between the anode space and the cathode space is obtained as follows.

$$a_{70}/c_{25}=2PO(1-PW_{25})/PN/PH_{70}$$

where $PW_{25}$, PN, and PO are constants. Regarding $PH_{70}$, an actually measured value can be used as a constant. Therefore, by compensating for the temperature difference between $a_{70}$ and $c_{25}$, a volume ratio between the anode space and the cathode space is obtained.

When actual parameters are assigned, the volume (theoretical value) of the anode space is substantially equal to the volume of the cathode space. If hydrogen is more in amount, then the electrode potential is less likely to increase. As the size of the anode space increases, the size of the fuel cell system increases, hydrogen which will be wastefully consumed becomes necessary. Considering an actual reaction speed, a speed of cross leak in the polymer electrolyte membrane, a ratio of gasses which are not consumed in the reaction, etc, the volume of the anode space is suitably not smaller than the volume of the cathode space and not larger than three times as large as the volume of the cathode space, in actuality. With such a configuration, the electrode potential can be surely maintained to be lower than +0.88V during the state where the fuel cell system is not generating the electric power. Thereby, degradation of the electrodes can be prevented, and as a result, life of the electrodes can be improved. Also, with such a configuration, it is expected that degradation of the electrodes is prevented even when a stop period continues about one month. Inflow and outflow of leaking air and leaking hydrogen are nonnegligible depending on a capability of closing devices (e.g., closing valves). In that case, it is desirable to further increase the volume of the anode space to increase the amount of hydrogen. Based on experience, it is desired that the volume of the anode space be larger than the volume of the cathode space. If an upper limit is set, the volume of the anode space is preferably not smaller than the volume of the cathode space and not larger than three times as large as the volume of the cathode space. More preferably, the volume of the anode space is not smaller than 1.5 times as large as the volume of the cathode space and not larger than three times as large as the volume of the cathode space.

Embodiment 1

Hereinafter, an embodiment 1 of the present invention will be described. First, an internal structure of the fuel cell according to the present embodiment will be described. FIG. 1 is a view showing an example of a schematic configuration of the internal structure of the polymer electrolyte fuel cell according to the embodiment 1 of the present invention. As shown in FIG. 1, the polymer electrolyte fuel cell includes a polymer electrolyte membrane 11, a catalyst layer 12a, a catalyst layer 12c, a gas diffusion layer 13a, a gas diffusion layer 13c, an electrically-conductive separator 16a, an electrically-conductive separator 16c, a MEA gasket 17a, a MEA gasket 17c, and a separator gasket 18.

The catalyst layer 12a and the catalyst layer 12c are respectively disposed in close contact with both surfaces of the polymer electrolyte membrane 11. The gas diffusion layer 13a and the gas diffusion layer 13c have gas permeability and electrical conductivity and are respectively disposed in close contact with outer surfaces (surfaces on the opposite side of the polymer electrolyte membrane 11) of the catalyst later 12a and the catalyst layer 12c. The gas diffusion layer 13a and the catalyst layer 12a form an electrode (anode) 14a, while the gas diffusion layer 13c and the catalyst layer 12c form an electrode (cathode) 14c.

The electrode 14a, the electrode 14c, and the polymer electrolyte membrane 11 form an MEA (membrane electrode assembly) 15. The MEA 15 is sandwiched between the pair of electrically-conductive separator 16a and electrically-conductive separator 16c. The electrically-conductive separator 16a and the electrically-conductive separator 16c serve to mechanically fasten the MEA 15, and to electrically connect adjacent MEAs 15 in series.

The MEA 15 and the electrically-conductive separator 16a are sealed by the MEA gasket 17a, while the MEA 15 and the electrically-conductive separator 16c are sealed by the MEA gasket 17c. The electrically-conductive separator 16a and the electrically-conductive separator 16c are adapted to be in contact with the electrically-conductive separator 16c and the electrically-conductive separator 16a of associated adjacent cells 19 on their surfaces which are on the opposite side of the MEA 15. The electrically-conductive separator 16a and the electrically-conductive separator 16c are sealed by the separator gasket 18.

The polymer electrolyte membrane 11, the electrode 14a and the electrode 14c sandwiching the polymer electrolyte membrane 11, the pair of electrically-conductive separators 16a and 16c, the MEA gasket 17a and the MEA gasket 17c form a cell 19 which is a basic unit of the fuel cell.

An anode gas passage 20a and a cathode gas passage 20c are formed on the surface of the electrically-conductive separator 16a which is in contact with the MEA 15 and the surface of the electrically-conductive separator 16c which is in contact with the MEA 15, respectively, to supply reaction gases to the electrodes and to carry away the gases generated through the reaction and surplus gases. Gas inlets of the anode gas passages 20a are respectively connected to anode-side supply manifolds which are not shown. Gas outlets of the anode gas passages 20a are respectively connected to anode-side discharge manifolds which are not shown. The anode-side supply manifolds, the anode gas passages 20a, and the anode-side discharge manifolds form an anode-side gas passage 97 which is one passage in the interior of the fuel cell. Gas inlets of the cathode gas passages 20c are respectively connected to cathode-side supply manifolds which are not shown. Gas outlets of the cathode gas passages 20c are respectively connected to cathode-side discharge manifolds which are not shown. The cathode-side supply manifolds, the cathode gas passages 20c, and the cathode-side discharge manifolds form a cathode-side gas passage 98 which is one passage in the interior of the fuel cell. A cooling water passage 21 is formed on each of the electrically-conductive separator 16a and the electrically-conductive separator 16c to be located at an interface between adjacent cells 19. Cooling water is flowed in the cooling water passage 21. The cooling water removes heat generated in the MEA 15, via the electrically-conductive separator 16a and the electrically-conductive separator 16c.

In the present embodiment, the cell 19 is preferably manufactured as follows. Carbon powder comprised of acetylene black (Denka Black produced by Denki Kagaku Co. Ltd, particle diameter of 35 nm) is mixed with an aqueous dispersion (D1 produced by DAIKIN INDUSTRIES, Ltd.) of polytetrafluoroethylene (PTFE) to produce a water-repellent ink containing 20 wt % of PTFE as a dry weight. The ink is applied onto and impregnated in a carbon paper (TGPHO60H produced by TORAY Co. Ltd) which is a base material of the gas diffusion layer. The carbon paper impregnated with the ink is subjected to thermal treatment at 300° C. using a hot air drier to produce the gas diffusion layer 13a and the gas diffusion layer 13c (about 200 μm).

66 wt part of a catalyst body (50 wt % is Pt) produced by carrying Pt catalyst on Ketjen Black (Ketjen Black EC, particle diameter of 30 nm manufactured by Ketjen Black International Co., Ltd) which is a carbon powder is mixed with 33 wt part (polymer dry weight) of perfluorosulfonic acid ionomer (5 wt % of Nafion dispersion liquid manufactured by Aldrich Co Ltd. in US) which is a hydrogen ion conduction material and is a bonding agent. The resulting mixture is molded to form the catalyst layer 12a and the catalyst layer 12c (10 to 20 μm).

The gas diffusion layers 13a and 13c and the catalyst layers 12a and 12c which have been produced as described above are joined to the both surfaces of the polymer electrolyte membrane 11 (Nafion 112 membrane manufactured by Dupont Co. Ltd. in US), thus manufacturing the MEA 15.

Next, rubber-made gasket plates (MEA gasket 17a and MEA gasket 17c) are joined to outer peripheral regions of the polymer electrolyte membrane 11 of the MEA 15 manufactured as described above, to form manifold holes for the cooling water, the fuel gas, and the oxidizing gas to flow therethrough. The electrically-conductive separators 16a and 16c are formed of graphite plates each of which has an outside dimension of (20 cm×32 cm×1.3 mm), is impregnated with phenol resin and is provided with a groove-like gas passage and a groove-like cooling water passage having a depth of 0.5 mm. The separator gasket 18 is made of, for example, at least one material selectable from a group consisting of fluorocarbon rubber, polyisoprene, butyl rubber, ethylene-propylene rubber, silicone rubber, nitrile rubber, thermoplastic elastomer, liquid crystal polymer, polyimide resin, polyether ether ketone resin, polyetherimide resin, polyphenylene sulfide resin, terephthalamido resin, polyethersulfonic resin, polysulfonic resin, sybdiotactic polystyrene resin polymethyl pentene resin, denaturation polyphenyleneether resin, polyacetal resin, polypropylene resin, fluorocarbon resin, and polyethylene telephthalete resin (including a composite material containing two or more kinds of these materials). In view of durability, fluorocarbon rubber is preferable.

Finally, the MEA 15, the electrically-conductive separator 16a and the electrically-conductive separator 16c, and the separator gasket 18 are stacked to manufacture the cell 19.

Figure 2:
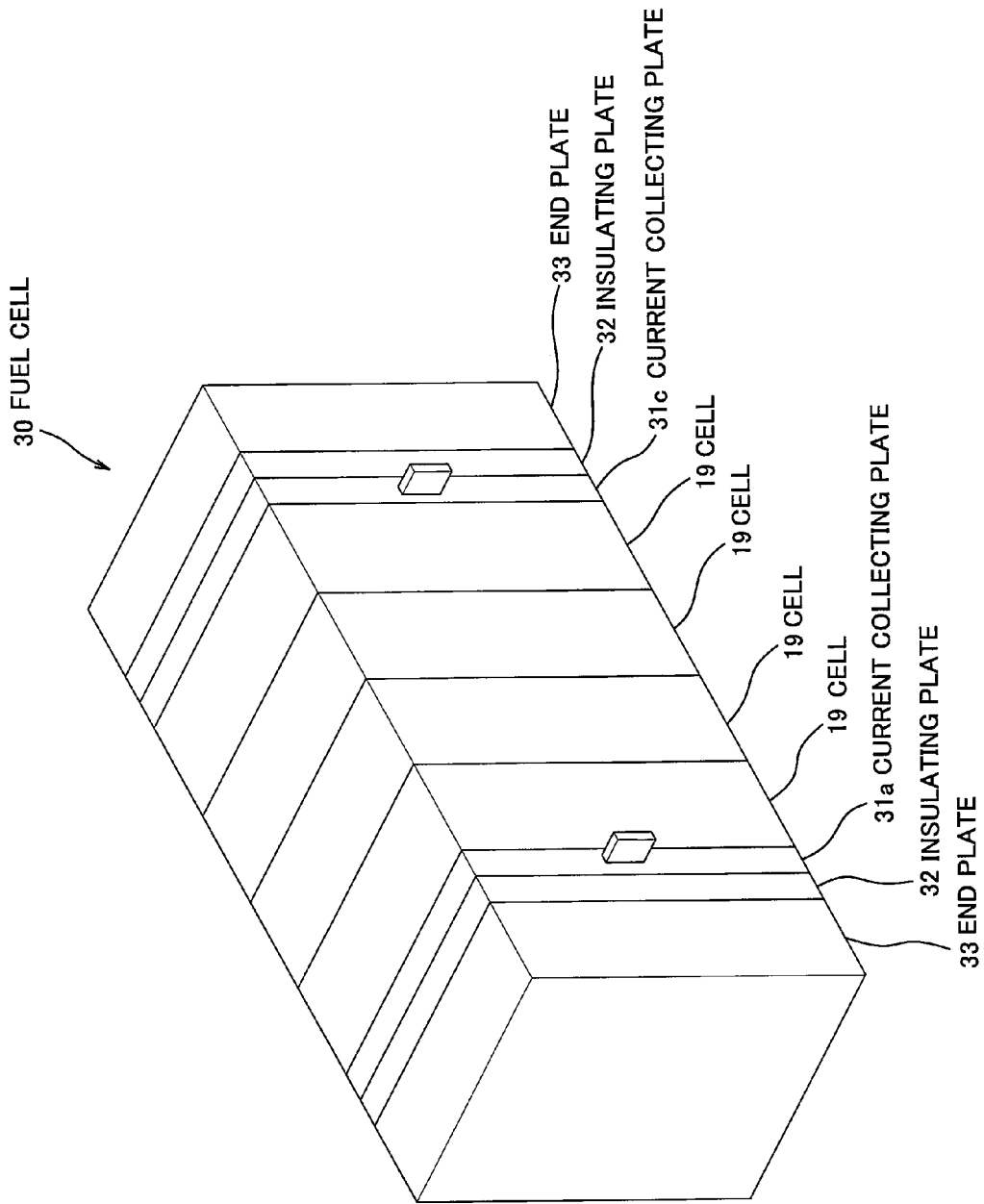
FIG. 2 is a perspective view schematically showing a structure of a fuel cell (stack) formed by stacking cells.

FIG. 2 is a perspective view schematically showing a structure of a fuel cell (stack) formed by stacking cells. A fuel cell 30 includes a plurality of stacked cells 19, a pair of current collecting plate 31a and current collecting plate 31c, a pair of insulating plates 32, and a pair of end plates 33. The voltage per cell is typically as low as +0.75V. Therefore, in the fuel cell 30, the plurality of cells 19 are stacked in series to be able to achieve a high voltage. An electric current is taken out from the fuel cell 30 through the current collecting plates 31a and 31c. The insulating plates 32 serve to electrically insulate the cells 19 from outside. The end plates 33 serve to fasten and mechanically retain the fuel cell 30 including the stacked cells 19.

Figure 3:
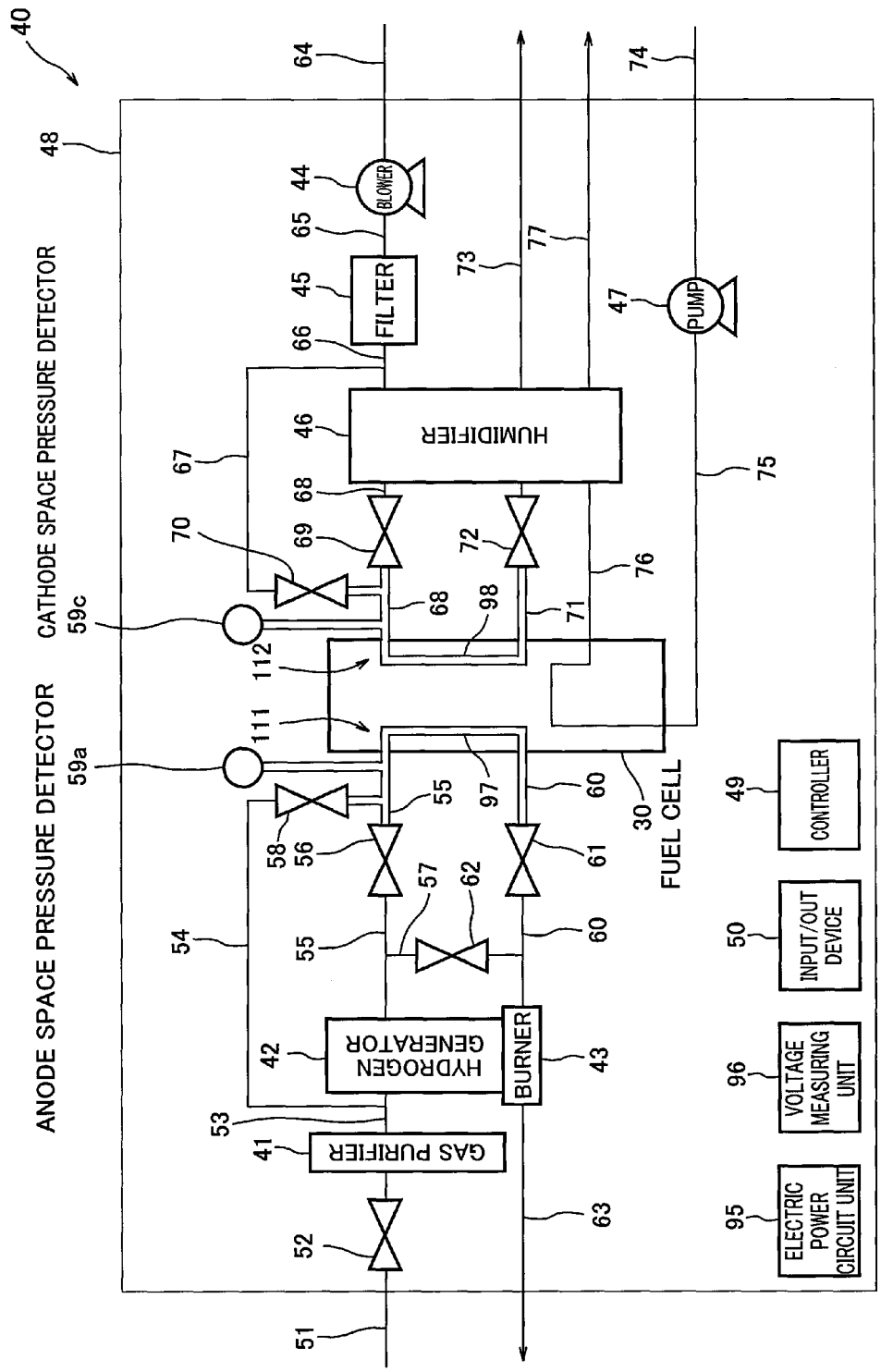
FIG. 3 is a block diagram showing an example of a schematic configuration of a hardware of a fuel cell system according to the embodiment 1 of the present invention.

Hereinafter, a fuel cell system according to the embodiment 1 of the present invention will be described such that a hardware and a control system are distinguished from each other. First, the hardware will be described. FIG. 3 is a block diagram showing an example of a schematic configuration of the hardware of the fuel cell system according to the embodiment 1 of the present invention. A fuel cell system 40 of the present embodiment includes as major components, the fuel cell 30, a gas purifier 41, a hydrogen generator 42, a burner 43, a blower 44, a filter 45, a humidifier 46, a pump 47, an outer casing 48, a controller 49, and an input/output device 50. The burner 43 is disposed to be able to supply combustion heat to the hydrogen generator 42.

Hereinafter, an anode-side gas supply system will be described. A gas inlet of the gas purifier 41 is coupled through an unpurified material gas supply pipe 51 to a gas main tap which is not shown. An on-off valve 52 is provided in the unpurified material gas supply pipe 51 to open and close a passage of the unpurified material gas supply pipe 51. A gas outlet of the gas purifier 41 is coupled to a gas inlet of the hydrogen generator 42 through a purified material gas supply pipe 53. A start end of a purified material gas bypass pipe 54 is coupled to the purified material gas supply pipe 53. A gas outlet of the hydrogen generator 42 is coupled to an anode-side gas inlet of the fuel cell 30 through a fuel gas supply pipe 55. An on-off valve (first on-off valve) 56 is provided in the fuel gas supply pipe 55 to open and close a passage of the fuel gas supply pipe 55. A start end of the fuel gas bypass pipe 57 is coupled to the fuel gas supply pipe 55 in a location between the hydrogen generator 42 and the on-off valve 56, while a terminal end of the purified material gas bypass pipe 54 is coupled to the fuel gas supply pipe 55 in a location between the on-off valve 56 and the fuel cell 30. An on-off valve (fifth on-off valve) 58 is provided in the purified material gas bypass pipe 54 to open and close a passage of the purified material gas bypass pipe 54. An anode space pressure detector 59a is attached on the fuel gas supply pipe 55 in a location between a portion of the fuel gas supply pipe 55 connected to the purified material gas bypass pipe 54 and the fuel cell 30 to detect a pressure in the interior of the passage.

Hereinafter, an anode-side gas discharge system will be described. An anode-side gas outlet of the fuel cell 30 is coupled to a gas inlet of the burner 43 through an off gas pipe 60. An on-off valve (second on-off valve) 61 is provided in the off gas pipe 60 to open and close a passage of the off gas pipe 60. A terminal end of the fuel gas bypass pipe 57 is coupled to the off gas pipe 60 in a location between the on-off valve 61 and the burner 43. The fuel gas bypass pipe 57 connects the fuel gas supply pipe 55 to the off gas pipe 60 so as to bypass the fuel cell 30. An on-off valve 62 is provided in the fuel gas bypass pipe 57 to open and close a passage of the fuel gas bypass pipe 57. A combustion exhaust gas discharge pipe 63 is coupled to a gas outlet of the burner 43 to be able to discharge an exhaust gas from the burner 43 to outside the fuel cell system.

The unpurified material gas supply pipe 51, the purified material gas supply pipe 53, the fuel gas supply pipe 55, the anode-side gas passage 97, the off gas pipe 60, and the combustion exhaust gas discharge pipe 63 form a fuel gas passage in the present embodiment. The purified material gas bypass pipe 54 and the on-off valve 58 constitute an inert gas supply device in the present embodiment. An anode space 111 in the present embodiment is defined by passages which are substantially isolated (sealed) from outside by closing the on-off valve 56, the on-off valve 61, and the on-off valve 58 (closing devices), to be specific, the interior of a portion of the fuel gas supply pipe 55 which extends from the on-off valve 56 to the anode-side gas inlet of the fuel cell 30, the interior of a portion of the purified material gas bypass pipe 54 which extends from the on-off valve 58 to the fuel gas supply pipe 55, the anode-side gas passage 97, the interior of a portion of the off-gas pipe 60 which extends from the anode-side gas outlet of the fuel cell 30 to the on-off valve 61, and the interior of a pipe coupling the anode space pressure detector 59$a$ to the fuel gas supply pipe 55 (part indicated by double lines in FIG. 3).

Hereinafter, a cathode-side gas supply system will be described. An oxidizing gas intake pipe 64 is coupled to a gas inlet of the blower 44 so that the blower 44 can take in air from outside. A gas outlet of the blower 44 is coupled to a gas inlet of a filter 45 through an unpurified oxidizing gas supply pipe 65. A gas outlet of the filter 45 is coupled to an oxidizing gas inlet of the humidifier 46 through a purified oxidizing gas supply pipe 66. A start end of the purified oxidizing gas bypass pipe 67 is coupled to the purified oxidizing gas supply pipe 66. A cathode-side gas inlet of the fuel cell 30 is coupled to an oxidizing gas outlet of the humidifier 46 through a humidified oxidizing gas supply pipe 68. An on-off valve (third on-off valve) 69 is provided in the humidified oxidizing gas supply pipe 68 to open and close a passage of the humidified oxidizing gas supply pipe 68. A terminal end of the purified oxidizing gas bypass pipe 67 is coupled to the humidified oxidizing gas supply pipe 68 in a location between the on-off valve 69 and the fuel cell 30, and a cathode space pressure detector 59$c$ is attached on the humidified oxidizing gas supply pipe 68 in a location between the fuel cell 30 and a connecting portion of the purified oxidizing gas bypass pipe 67 connected to the humidified oxidizing gas supply pipe 68 to detect a pressure in the interior of the passage. An on-off valve (sixth on-off valve) 70 is provided in the purified oxidizing gas bypass pipe 67 to open and close a passage of the purified oxidizing gas bypass pipe 67.

Hereinafter, a cathode-side gas discharge system will be described. A cathode-side gas outlet of the fuel cell 30 is coupled to an exhaust oxidizing gas inlet of the humidifier 46 through an oxidizing gas discharge pipe 71. An on-off valve (fourth on-off valve) 72 is provided in the oxidizing gas discharge pipe 71 to open and close a passage of the oxidizing gas discharge pipe 71. An exhaust oxidizing gas discharge pipe 73 is coupled to an exhaust oxidizing gas outlet of the humidifier 46 to be able to discharge the exhaust oxidizing gas discharged from the humidifier to outside the system.

The oxidizing gas intake pipe 64, the unpurified oxidizing gas supply pipe 65, the purified oxidizing gas supply pipe 66, the humidified oxidizing gas supply pipe 68, the cathode-side gas passage 98, the oxidizing gas discharge pipe 71, and the exhaust oxidizing gas discharge pipe 73 form an oxidizing gas passage of the present embodiment. The purified oxidizing gas bypass pipe 67 and the on-off valve 70 constitute an air supply device of the present embodiment. A cathode space 112 in the present embodiment is defined by passages which are substantially isolated (sealed) from outside by closing the on-off valve 69, the on-off valve 72, and the on-off valve 70 (closing devices), to be specific, the interior of a portion of the humidified oxidizing gas supply pipe 68 which extends from the on-off valve 69 to the cathode-side gas inlet of the fuel cell 30, the interior of a portion of the purified oxidizing gas bypass pipe 67 which extends from the on-off valve 70 to the humidified oxidizing gas supply pipe 68, the cathode-side gas passage 98, the interior of a portion of the oxidizing gas discharge pipe 71 which extends from the cathode-side gas outlet of the fuel cell 30 to the on-off valve 72, the interior of a pipe coupling the cathode space pressure detector 59$c$ to the humidified oxidizing gas supply pipe 68 (part indicated by a double line in FIG. 3).

The volume of the anode space and the volume of the cathode space are measured and compared in a method described below, for example. A first method is as follows. A first gas (e.g., nitrogen) is filled into the anode space and the cathode space, and a second gas (e.g., hydrogen) is injected into the anode space and the cathode space at the same time. Time taken for the second gas to flow out from the anode space and time taken for the second gas to flow out from the cathode space are measured and thereby the size of the anode space and the size of the cathode space are compared. A second method is as follows. In the first method, data indicating the relationship between the times taken for the second gas to flow out and the volumes is obtained in advance and the volumes are determined based on the measured times. A third method is as follows. A portion corresponding to the anode space or the cathode space is disassembled from the system and water is filled into the anode space and the cathode space. The volume of the anode space and the volume of the cathode space are measured, for example, 1) by measuring the amount of water filled thereinto, 2) by measuring the amount of water flowing out therefrom, or 3) by measuring increases in weights of the portion.

Hereinafter, a system of cooling water will be described. A cooling water inlet of a pump 47 is coupled through a cooling water intake pipe 74 to a cooling water outlet of a hot water storing tank which is not shown. A cooling water outlet of the pump 47 is coupled to a cooling water inlet of the fuel cell 30 through a cooling water supply pipe 75. A cooling water outlet of the fuel cell 30 is coupled to a cooling water inlet of the humidifier 46 through a cooling water discharge pipe 76. A cooling water outlet of the humidifier 46 is coupled through a cooling water re-supply pipe 77 to a cooling water inlet of the hot water storing tank which is not shown.

In the present embodiment, as the material gas, a hydrocarbon based gas such as a natural gas or a propane gas, can be used. Suitably, a city gas 13A which is a mixture gas of methane, ethane, propane, and butane may be used. In the present embodiment, air is used as the oxidizing gas, but any mixture gas may be used so long as it is a mixture of the oxidizing agent and the inert gas. As the gas purifier 41, in particular, means for removing a gas odorant, such as TBM (tertiary butyl mercaptan), DMS (dimethyl sulfide), or THT (tetrahydrotiophene) is used. This is because sulfur compound such as an odorant tends to be adsorbed on the catalyst of the fuel cell and poison the catalyst, impeding proceeding of the reaction. As the humidifier 46, means for flowing the oxidizing gas in hot water, means for blowing water into the oxidizing gas, etc may be used. One example of this is, suitably, a total enthalpy heat exchange type humidifier. The total enthalpy heat exchange type humidifier is adapted to transfer water and heat from the exhaust gas to the oxidizing gas supplied from the oxidizing gas intake pipe 64 and thereafter to transfer water and heat from the cooling water to the oxidizing gas when the exhaust gas and the cooling water pass through the humidifier 46. As the on-off valves 52, 56, 58, 61, 62, 69, 70, and 72, any valves may be used so long as they are able to close the passages of the associated pipes. For example, an electromagnetic valve, a power-driven ball valve, etc may be used. As the anode space pressure detector 59a and the cathode space pressure detector 59c, any detectors may be used so long as they are able to detect the pressures of gases in the passages inside the associated pipes. For example, pressure sensors using diaphragm may be used. In the present embodiment, as the inert gas, the material gas which has been purified by the gas purifier 41 may be used. Since the material gas contains, as a major component, the methane gas, it does not substantially have a reactivity to the polymer electrolyte fuel cell used in the present embodiment, and therefore may be used as the inert gas. The inert gas is not necessarily the material gas, and any gases may be used so long as they do not cause electrode reaction (do not contribute to oxidation and reduction reactions of the electrodes) do not degrade the electrodes, and are chemically stable, in the interior of the fuel cell in a stop state. As the inert gas, the city gas such as 13A, natural gas, methane gas, ethane gas, propane gas, butane gas, nitrogen, argon may be used. When the inert gas such as nitrogen or argon is used, a cylinder is preferably equipped. Hydrogen gas is incapable of being used as the inert gas. In cases where the city gas containing methane or propane is used as the material gas, a gas which has been purified by removing odorants (S component) which are impurities contained in the city gas is used as the inert gas. It should be noted that the removal of the impurities is performed to prevent poisoning of Pt contained in the catalyst layer.

Figure 4:
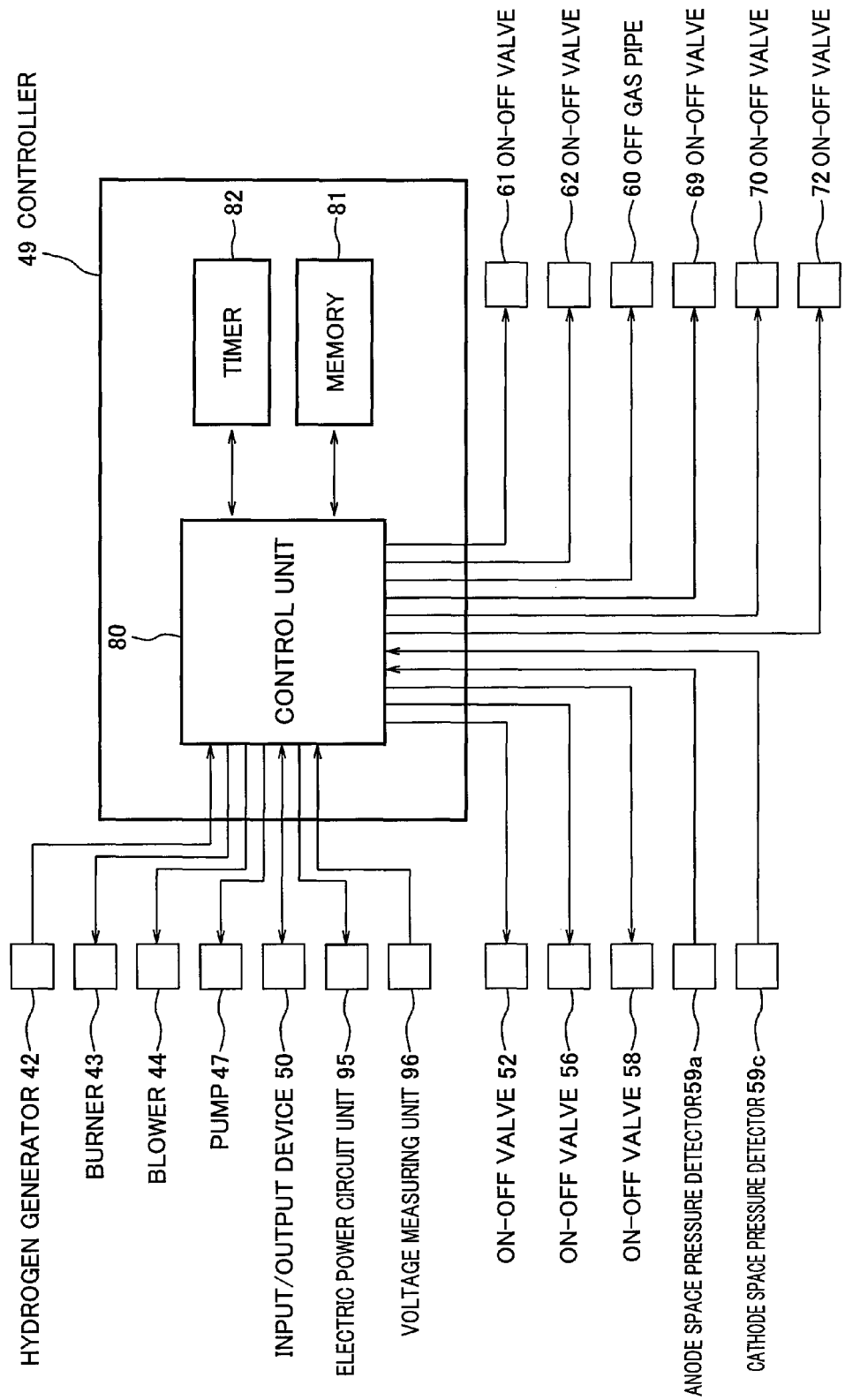
FIG. 4 is a block diagram showing a schematic configuration of a control system of the fuel cell system according to the embodiment 1 of the present invention.

Subsequently, the control system will be described. FIG. 4 is a block diagram showing a schematic configuration of the control system of the fuel cell system according to the embodiment 1 of the present invention. The control system of the fuel cell system of the present embodiment comprises a controller 49 including a control unit 80, a memory 81, and a timer 82. The control unit 80 is configured to receive signals from the timer 82 and the input/output device 50 and to store calculation results or the like in the memory 81 as desired. The control unit 80 is configured to receive detection signals from a temperature detector (not shown) attached on the hydrogen generator 42, the anode space pressure detector 59a, the cathode space pressure detector 59c, and a voltage measuring unit 96 and to control the operations of the burner 43, the on-off valve 52, the on-off valve 56, the on-off valve 58, the on-off valve 61, the on-off valve 62, the on-off valve 69, the on-off valve 70, the on-off valve 72, the blower 44, the pump 47, and the electric power circuit unit 95, based on programs stored in the memory 81 and parameter values received from the input/output device 50.

As the control unit 80, for example, a CPU is used. As the memory 81, for example, an internal memory is used. As the timer 82, for example, a clock circuit with a calendar is used. In the present embodiment, one controller 49 and one control unit 80 are equipped to be able to execute centralized control, but a plurality of controllers 49 and control units 80 may be equipped to be able to execute distributed control.

[Basic Operation]

Subsequently, a basic operation of the fuel cell system of the present embodiment will be described. First, supply of the fuel gas will be described. The material gas is taken in from outside through the unpurified material gas supply pipe 51, and is purified in the gas purifier 41 for removing substances which negatively affect the fuel cell. Thereafter, the gas is guided to the hydrogen generator 42 through the purified material gas supply pipe 53. The material gas is pressurized in the main gas tap and is supplied. The flow rate of the material gas is controlled by a needle valve (or booster pump, etc) which is not shown and is provided in the unpurified material gas supply pipe 51 in a location between the on-off valve 52 and the gas purifier 41. The hydrogen generator 42 generates the fuel gas containing at least hydrogen from the material gas through a steam-reforming reaction. The fuel gas is guided from the hydrogen generator 42 to the anode side of the fuel cell 30 through the fuel gas supply pipe 55.

In the hydrogen generator 42, hydrogen is generated through a reaction or the like indicated by (chemical formula 6). Carbon monoxide generated concurrently with hydrogen is removed to reach 10 ppm or less through a shift reaction indicated by (chemical formula 7) and a carbon monoxide selective oxidization reaction indicated by (chemical formula 8).

$$CH_4+H_2O \rightarrow 3H_2+CO(-203.0\ kJ/mol) \quad \text{(chemical formula 6)}$$

$$CO+H_2O \rightarrow CO_2+H_2 \quad \text{(chemical formula 7)}$$

$$CO+\tfrac{1}{2}O_2 \rightarrow CO_2 \quad \text{(chemical formula 8)}$$

If water which is more than a minimum amount required for the reaction is supplied, a fuel gas containing hydrogen and moisture is generated, and flows into the fuel cell 30 of the fuel cell through the fuel gas supply pipe 55. A reaction for generating the fuel gas from the material gas is an endothermic reaction as indicated by (chemical formula 6). Combustion heat generated in the burner 43 is used as heat required for the reaction.

Hereinafter, discharge of the fuel gas will be described. The fuel gas, which has passed through the fuel cell 30, is guided to the burner 43 through the off gas pipe 60 and combusted therein. An exhaust gas from the burner 43 is discharged outside the fuel cell system through the combustion exhaust gas discharge pipe 63. In cases where the fuel gas discharged contains high-concentration CO in, for example, the start-up state of the hydrogen generator 42, the controller 49 closes the on-off valve 56, and the on-off valve 61, and opens the on-off valve 62 provided in the fuel gas bypass pipe 57. Under such control, the fuel gas is guided to the off gas pipe 60 so as to bypass the fuel cell 30 and is combusted in the burner 43. The combustion heat from the burner 43 is used to increase the temperature of the hydrogen generator 42, an endothermic reaction for generating the fuel gas from the material gas, etc.

Hereinafter, supply of the oxidizing gas will be described. The oxidizing gas (air) is taken into the blower 44 from outside through the oxidizing gas intake pipe 64, is pressurized therein, and is supplied to the filter 45. After the impurities are removed from the oxidizing gas in the filter 45, the oxidizing gas is humidified in the humidifier 46 to take in moisture necessary for the fuel cell and is guided to the cathode side of the fuel cell 30 through the humidified oxidizing gas supply pipe 68.

Hereinafter, discharge of the oxidizing gas will be described. The exhaust oxidizing gas discharged from the fuel cell 30 is guided to the humidifier 46 through the oxidizing gas discharge pipe 71. The exhaust oxidizing gas has high-temperature and contains plenty of moisture. The exhaust oxidizing gas supplies water and heat to the oxidizing gas in the humidifier 46. The exhaust oxidizing gas discharged from the humidifier 46 is discharged outside the fuel cell system through the exhaust oxidizing gas discharge pipe 73.

Hereinafter, flow of the cooling water will be described. The pump 47 takes in the cooling water from the hot water storing tank through the cooling water intake pipe 74. The cooling water is supplied to the fuel cell 30 through the cooling water supply pipe 75. The cooling water discharged from the fuel cell 30 is supplied to the humidifier 46 through the cooling water discharge pipe 76. The cooling water discharged from the fuel cell 30 has a high temperature. The cooling water supplies moisture and heat to the oxidizing gas in the humidifier 46. The cooling water discharged from the humidifier 46 is returned to the hot water storing tank through the cooling water re-supply pipe 77. The flow of the cooling water in the fuel cell 30 of the fuel cell allows the fuel cell 30 generating heat to be kept at a constant temperature. The heat generated in the fuel cell 30 of the fuel cell is stored in the hot water storing tank and used for supplying hot water, etc.

One example of the operation conditions of the present embodiment is as flows. The temperature of the fuel cell 30 is 70° C., fuel gas utilization rate (Uf) is 75%, and oxygen utilization rate (Uo) is 50%. The fuel gas and the air are humidified to have a dew point of 66° C. and a dew point of 66° C., respectively. An electric current having a certain voltage is taken out as an electric power from the electric power circuit unit 95. The electric current is controlled to have a current density of 0.2 A/cm² with respect to an apparent area of the electrode. The operation of the pump 47 is controlled so that the temperature of water in the cooling water intake pipe 74 is 60° C. and the temperature of water in the cooling water re-supply pipe 77 is 68° C.

[Power Generation Reaction]

In the fuel cell 30, the electric power and heat are generated using the fuel gas supplied to the anode side and the oxidizing gas supplied to the cathode side. When the electric power circuit unit 95 sends to the fuel cell system 40, a request for supplying the electric power, the controller 49 determines the amount of electric power to be supplied from an electric power system and the amount of electric power (target value of electric power generated in power generation) generated in and supplied from the fuel cell 30. The controller 49 sends to the devices such as the pump and the blower so that the electric power generated in power generation changes at a constant speed (rate: e.g., 1 W/second) to reach the target value of electric power generated in power generation. At this time, the voltage of the fuel cell 30 is monitored in the voltage measuring unit 96. Upon detecting a voltage drop of a specified value or larger, a command is sent to the devices so that changing of the electric power generated in power generation is stopped. The electric power circuit unit 95 converts a DC electric power taken out from the fuel cell 30 into an AC electric power, and is connected to an electric power line used at home, etc by so-called power system interconnection.

Hereinafter, a procedure of power generation within the fuel cell 30 will be described with reference to FIG. 1. Oxygen-containing gas such as air is flowed in the cathode gas passage 20c, while the fuel gas containing hydrogen is flowed in the anode gas passage 20a. Hydrogen in the fuel gas diffuses in the gas diffusion layer 13a and reaches the catalyst layer 12a. In the catalyst layer 12a, hydrogen is separated into hydrogen ions and electrons. The electrons are migrated to the cathode side through an external circuit. The hydrogen ions migrate to the cathode side through the polymer electrolyte membrane 11, and reach the catalyst layer 12c. Oxygen in the oxidizing gas such as air diffuses in the gas diffusion layer 13c and reaches the catalyst layer 12c. In the catalyst layer 12c, oxygen reacts with electrons and is converted into oxygen ions which further react with hydrogen ions to generate water. As a whole, the oxygen-containing gas and the fuel gas react with each other in the MEA 15 and in its vicinity, thereby generating water, and an electromotive force is generated between the catalyst layer 12a and the catalyst layer 12c. In the reaction, heat as well as water is generated, causing the temperature of the MEA 15 to rise. The generated heat is carried away outside the fuel cell 30 by the cooling water flowing in the cooling water passage 21. In the power generation of the fuel cell, it is important to control humidity of the gases supplied and the amount of water generated through the reaction. If moisture is less, the polymer electrolyte membrane 11 is dried. In a dried polymer electrolyte membrane, migration of the hydrogen ions reduces because of reduction of ionization of fixed electric charge, reducing the amount of power generation and the amount of heat generation. On the other hand, if moisture is excess, water stays in the MEA 15 and its vicinity or in the catalyst layers 12a and 12c and in their vicinities. If the water stays there, supply of the gases is impeded and the reaction is suppressed, reducing the amount of power generation and the amount of heat generation.

Hereinafter, the power generation reaction will be described. The fuel cell of the present embodiment is configured to cause the gas diffusion electrodes to electrically react the fuel gas containing at least hydrogen and the oxidizing gas containing oxygen such as air to generate electricity and heat simultaneously. The reactions indicated by (chemical formula 9) and (chemical formula 10) occur in the catalyst layer 12a and the catalyst layer 12c, respectively, and the reaction indicated by (chemical formula 11) occurs in the entire fuel cell.

$$H_2 \rightarrow 2H^+ + 2e^- \qquad \text{(chemical formula 9)}$$

$$\tfrac{1}{2}O_2 + 2H^+ + 2e^- \rightarrow H_2O \qquad \text{(chemical formula 10)}$$

$$H_2 + \tfrac{1}{2}O_2 \rightarrow H_2O \qquad \text{(chemical formula 11)}$$

The fuel gas containing at least hydrogen causes the reaction (hereinafter referred to as an anode reaction) indicated by (chemical formula 9). The hydrogen ions, which have migrated through the polymer electrolyte membrane 11, causes the reaction (hereinafter referred to as a cathode reaction) indicated by (chemical formula 10) with the oxidizing gas in the catalyst layer 12c to generate water while generating electricity and heat. The side associated with the fuel gas such as hydrogen is the anode side (region indicated by a in the drawing) and the side associated with the oxidizing gas such as air is the cathode side (region indicated by c in the drawing).

The polymer electrolyte membrane 11 has the fixed electric charge, and the hydrogen ions are present as counter ions of the fixed electric charge. The polymer electrolyte membrane 11 is required to be able to cause the hydrogen ions to selectively permeate therethrough. To this end, the polymer electrolyte membrane 11 is required to retain moisture. This is because, the moisture contained in the polymer electrolyte membrane 11 makes it possible that the fixed electric charge fixed within the polymer electrolyte membrane 11 are ionized, and hydrogen which are the counter ions of the fixed electric charge are ionized and migrate.

[Stop Operation]

Figure 5:
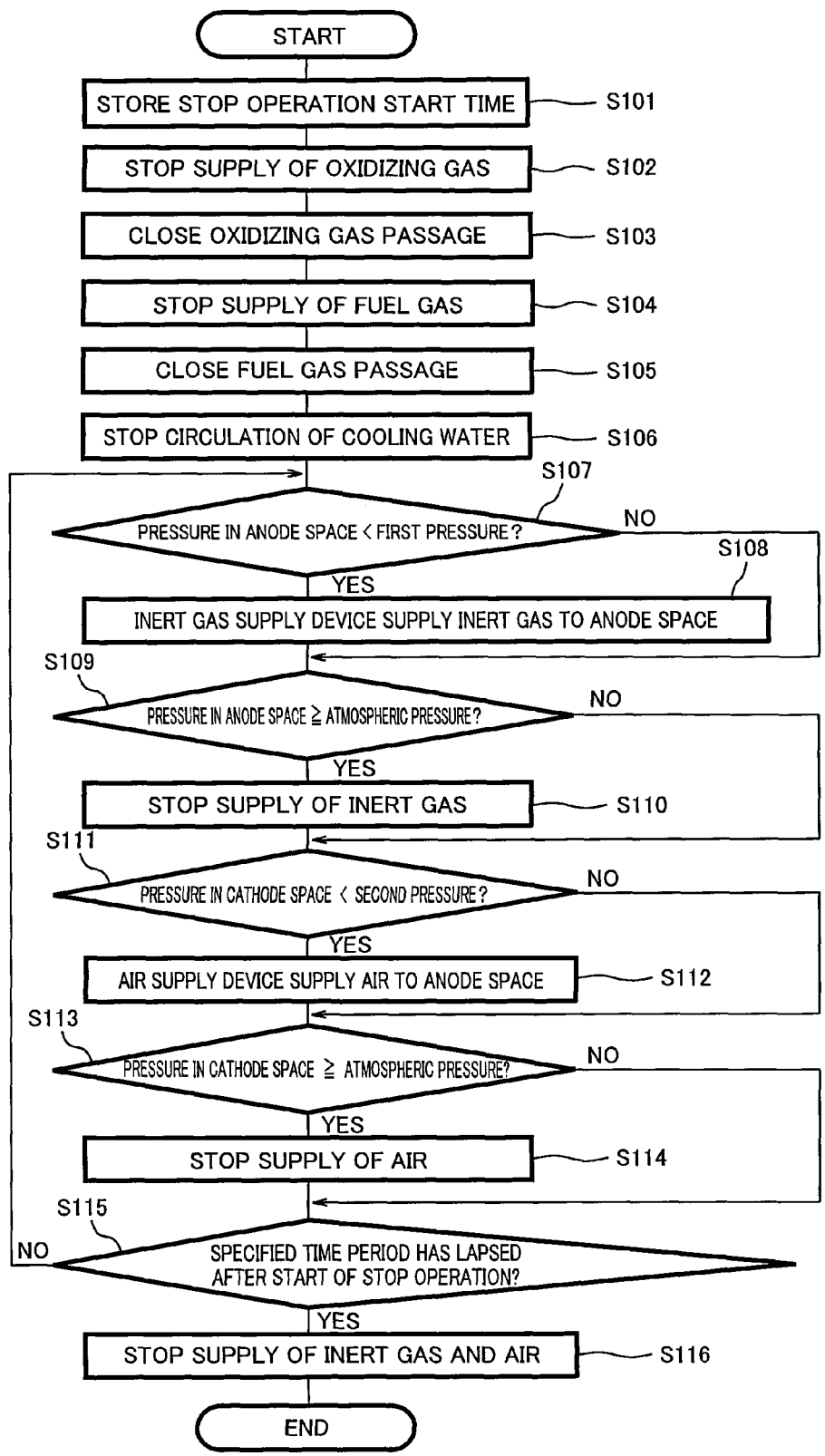
FIG. 5 is a flowchart showing a stop operation of the fuel cell system according to the embodiment 1 of the present invention.

FIG. 5 is a flowchart showing a stop operation of the fuel cell system according to the embodiment 1 of the present invention. Hereinafter, the stop operation of the fuel cell system of the present invention will be described with reference to FIG. 5.

For example, when the external load connected to the electric power circuit unit 95 changes, and thereby the request for supplying the electric power with respect to the fuel cell system 40 changes, the controller 49 detects this, and determines whether the power generation in the fuel cell 30 should be continued or the power generation in the fuel cell 10 is stopped and all of the requested electric power should be supplied from external equipment (system). If it is determined that the power generation in the fuel cell 30 should be continued, the controller 49 sends a command to the devices such as the pump and the blower so that the electric power to be generated changes (increases or decreases) with a constant change rate up to a target value which is a desired electric power generated in the power generation. On the other hand, if it is determined that the power generation in the fuel cell 30 should be stopped, the controller 49 starts the stop operation (start). When the stop operation is started, a first stop step is initially performed.

1. First Stop Step

The controller 49 receives a current time from the timer 82 and stores it as a stop operation start time (step S10). The supply of the oxidizing gas from the blower is stopped (step S102), and the on-off valve 69 and the on-off valve 72 are closed to close the oxidizing gas passage (step S103). In the power generation operation, the on-off valve 70 is closed and is closed at the time of step 103. As a result of such an operation, the cathode space 112 is isolated from outside. The supply of the fuel gas from the hydrogen generator 42 is stopped (step S104). The on-off valve 56 and the on-off valve 61 are closed, and the fuel gas passage is closed (step S105). During the power generation operation, the on-off valve 58 is closed and is closed at the time of step S105. As a result of such an operation, the anode space 111 is isolated from outside and the power generation is stopped (i.e., taking out an electric current is stopped). When the supply of the fuel gas and the supply of the oxidizing gas are stopped, circulation of the cooling water is stopped (step S106). When the anode space 111 and the cathode space 112 are tightly closed, it is desirable that the potential of the anode and the potential of the cathode in the stop state be maintained at about ±0V (vs. SHE) by stopping the operation of the fuel cell 30 under the condition where the fuel cell contains least possible oxygen, and that the cathode and the anode be tightly closed in this order. In view of energy efficiency, it is a waste of the material gas if it is used during a state where the fuel cell system is not generating the electric power (electric current is not taken out from the fuel cell 30). For this reason, it is most desirable that the cathode and the anode be tightly closed in the above described order substantially simultaneously. Through the above described operation, the first stop step is terminated. After the first stop step is terminated, a second stop step is performed.

2. Second Stop step

In a second stop step, the supply of the fuel gas and the supply of the oxidizing gas are in a stopped state, the temperature of the fuel cell 30 decreases, and the pressure in the anode space 111 and the pressure in the cathode space 112 decrease. The main cause of the pressure decrease is that cross leak via the polymer electrolyte membrane 11 occurs and causes hydrogen and oxygen to be consumed through the reaction, and steam is condensed due to temperature decrease. The controller 49 causes the anode space pressure detector 59a to detect the pressure (anode space pressure) in the anode space 111, and causes the cathode space pressure detector 59c to detect the pressure (cathode space pressure) in the cathode space 112.

In the second stop step, first, it is determined whether or not the anode space pressure is lower than a first pressure (step S1107). If it is determined YES in step S107, the on-off valve 58 is opened. At this time, the on-off valve 52 is fully opened, and the needle valve (not shown) which is provided in the unpurified material gas supply pipe 51 in the location between the on-off valve 52 and the gas purifier 41 is fully opened as well (the pump is in a stopped state and is fully opened in a case where the booster pump or the like is used instead of the needle valve). Therefore, the material gas (inert gas), which has been purified in the gas purifier 41, is supplied to the anode space 111 through the purified material gas bypass pipe 54 (step S108), and it is determined whether or not to stop supply of the inert gas. If it is determined NO in step S107, then it is determined whether or not to stop the supply of the inert gas.

In the present embodiment, the first pressure is set to a value which is 5 kPa lower than an ambient pressure. The ambient pressure may be an atmospheric pressure around the fuel cell system which is detected by an ambient pressure detector (not shown). As the ambient pressure, 101.3 kPa (one atmosphere: standard atmospheric pressure) may be used as a fixed value. The reason why the first pressure is set to the value which is 5 kPa lower than the ambient pressure is that an operation pressure of an actual low-pressure loss type fuel cell system is commonly not higher than a value in a range of 5 to 10 kPa, and a burden placed on a sealing part can be reduced by eliminating a negative pressure with a pressure lower than the operation pressure. The first pressure may be lower in order to reduce the number of times the on-off valve 58 is opened and closed. In this case, a value which is 20 kPa lower than the ambient pressure is a lower limit value in view of a general proof pressure of the sealing part. Alternatively, the anode space pressure detector 59a may be configured to detect a difference pressure (negative pressure) between the ambient pressure and the anode space pressure. In such a configuration, the on-off valve 58 is controlled based on comparison between the negative pressure and the first pressure, and thereby substantially similar effects can be achieved. The first pressure may be decided based on the supply pressure of the material gas as a reference, rather than the ambient pressure. For example, the first pressure may be set to a value which is 5 kPa lower than the supply pressure of the material gas.

In the determination as to whether or not to stop the supply of the inert gas, it is determined whether or not the anode space pressure is not lower than the ambient pressure (step S109). If it is determined YES in step S109, the on-off valve 58 is closed and the supply of the material gas (inert gas) is stopped (step S10). After the step S110, determination as to the cathode space pressure is performed. If it is determined NO in step S109, then determination as to the cathode space pressure is performed.

In the determination as to the cathode space pressure, it is determined whether or not the cathode space pressure is lower than a second pressure (step S11). If it is determined YES in step S111, the on-off valve 70 is opened and the oxidizing gas (air) which has been purified in the filter 45 is supplied to the cathode space 112 through the purified oxidizing gas bypass pipe 67 (step S112), and it is determined whether or not to stop air supply. If it determined NO in step S111, then it is determined whether or not stop air supply. In step S112, the blower 44 is in a stopped state, but the amount of air to be supplied is small. So, the air flows into the cathode space 112 through a clearance of a scroll of the blower 44.

In the present embodiment, the second pressure is set to a value which is 5 kPa lower than an ambient pressure. The ambient pressure may be an atmospheric pressure around the fuel cell system which is detected by an ambient pressure detector (not shown). As the ambient pressure, 101.3 kPa (one atmosphere) may be used as a fixed value. The reason why the second pressure is set to a value which is 5 kPa lower than the ambient pressure is that the operation pressure of the actual low-pressure loss type fuel cell system is commonly not higher than a value in a range of 5 to 10 kPa, and a burden placed on the sealing part can be reduced by eliminating a negative pressure with a pressure lower than the operation pressure. The second pressure may be lower in order to reduce the number of times the on-off valve 70 is opened and closed. In this case, a value which is 20 kPa lower than the ambient pressure is a lower limit value in view of the general proof pressure of the sealing part. Alternatively, the cathode space pressure detector 59c may be configured to detect a difference pressure (negative pressure) between the ambient pressure and the cathode space pressure. In such a configuration, the on-off valve 70 is controlled based on comparison between the negative pressure and the second pressure, and thereby substantially similar effects can be achieved. The first pressure and the second pressure may be equal to each other or different from each other.

In the determination as to whether or not to stop supply of air, it is determined whether or not the cathode space pressure is not lower than the ambient pressure (step S113). If it is determined YES in step s113, the on-off valve 70 is closed, and supply of the air is stopped (step S114). After step S114, it is determined whether or not to stop the operation. If it is determined NO in step S114, then it is determined whether or not to stop supply of the inert gas and supply of air.

In the determination as to whether or not to stop supply of the inert gas and supply of air, it is determined whether or not a specified time period has lapsed after start of the stop operation (step S115). The time period is calculated using the stop operation start time stored in step S101 and the current time received from the timer 82. If the time period is longer than a specified time period (e.g., one hour), the supply of the inert gas and the supply of the air are stopped (step S116), and the fuel cell system enters a stand-by state (end). On the other hand, if the time period is not longer the specified time period, the process returns to step S107.

In the second stop step, if the pressure in the interior of the fuel cell 30 becomes a predetermined value or less, gas supply is repeatedly performed. As a result of such an operation, a concentration of hydrogen in the fuel gas decreases and hydrogen and the purified material gas finally fills in the anode space 111. Air gradually flows in the cathode space 112. Oxygen in the air cross-leaks and is consumed through a reaction with hydrogen. Finally, nitrogen substantially fills in the cathode space 112. Such an operation makes it possible to prevent damage to the components of the fuel cell 30 or the entry of oxygen into the fuel cell, which may be caused by the pressure change.

[Start-Up Operation]

Figure 6:
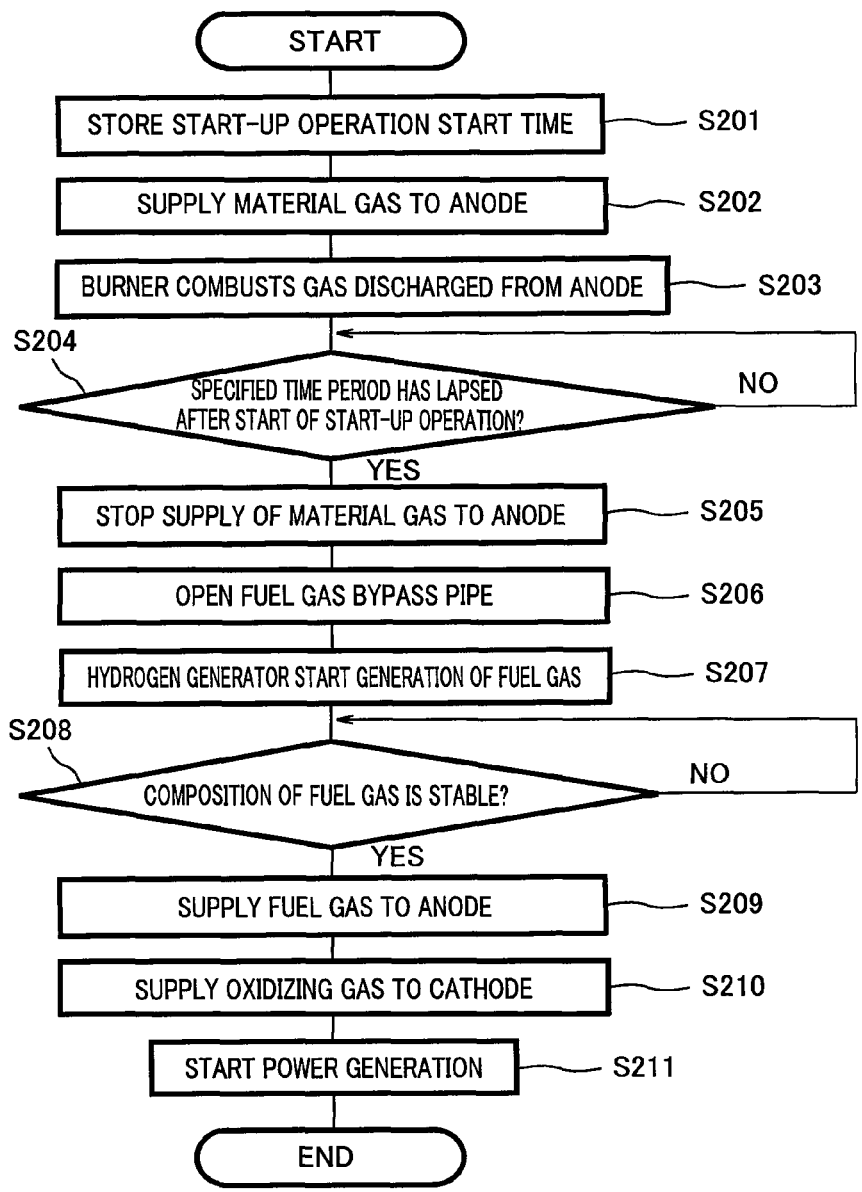
FIG. 6 is a flowchart showing a start-up operation of the fuel cell system according to the embodiment 1 of the present invention.

FIG. 6 is a flowchart showing a start-up operation of the fuel cell system according to the embodiment 1 of the present invention. Hereinafter, the start-up operation of the fuel cell system of the present invention will be described with reference to FIG. 6.

For example, when the external load connected to the electric power circuit unit 95 increases in the stand-by state, and thereby the request for supplying the electric power with respect to the fuel cell system changes, the controller 49 detects this, and determines whether all of the requested electric power should be supplied from the system or power generation in the fuel cell should be carried out. If it is determined that the power generation in the fuel cell should be started, the controller 49 starts a start-up operation (start). The controller 49 receives a current time from the timer 82 and stores it as a start-up operation start time (step S201). The on-off valve 56 and the on-off valve 62 are closed, and the on-off valve 52, the on-off valve 58 and the on-off valve 61 are opened. As a result of such an operation, the material gas which has been purified by the gas purifier 41 is supplied to the interior of the anode space 111 through the purified material gas bypass pipe 54 (step S202). The gas remaining in the anode space 111 is purged by the purified material gas and is combusted in the burner 43 (step S203). Combustion heat from the burner 43 is used to increase the temperature of the hydrogen generator 42. Such an operation makes it possible to prevent the release of deflagration gas into atmosphere, and efficiently use the energy of the gas remaining in the anode space 111.

After step S203, it is determined whether or not to stop the supply of the material gas to the anode. The supply of the material gas to the anode is stopped at the time point when an integrated flow rate of the material gas reaches an amount that is approximately three times as large as the volume of the anode space. In the present embodiment, a specified time period taken for the accumulated flow rate to reach the amount that is approximately three times as large as the volume of the anode space is decided in advance through a simulation experiment, on assumption that that the supply pressure of the material gas and the length and width of the pipes, and others are constant. Control is executed so that the supply of the material gas is stopped when the specified time period (e.g., five min) decided in the experiment lapses. To be specific, the time period that lapses from when the start-up operation has started is calculated using the start-up operation start time stored in step S201 and the current time received from the timer 82 in step S201, and it is determined whether or not the time period is longer than the specified time period (step S204). If it is determined that the time period is not longer than the specified time period, the process returns to step S204. On the other hand, if it is determined that the time period is longer than the specified time period, the on-off valve 58 and the on-off valve 61 are closed, so that the supply of the material gas to the anode is stopped (step S205). Alternatively, the control may be executed based on a detection result of an integrated flow rate meter, instead of the time period of flow of the gases.

When the supply of the material gas to the anode is stopped, the on-off valve 62 is opened (step S206), so that the material gas is sent to the hydrogen generator 42 and generation of the fuel gas is started therein (step S207). In step S207, the fuel gas from the hydrogen generator 42 is directly sent to the burner through the fuel gas bypass pipe 57 so as not to pass through the fuel cell 30. In some cases, the fuel gas emitted from the hydrogen generator 42 in the start-up state contains plenty of carbon monoxide. Such an operation makes it possible to prevent poisoning of the catalyst due to carbon monoxide in the interior of the fuel cell 30.

After start of the generation of the fuel gas, it is determined whether or not a composition of the fuel gas is stable (step S208). If the composition is stable and the concentration of carbon monoxide is sufficiently decreased, the on-off valve 62 is closed, and simultaneously the on-off valve 56 and the on-off valve 61 are opened, so that the fuel gas is supplied to the anode (step S209). In addition, the on-off valve 69 and the on-off valve 72 are opened, and the blower 39 is driven, so that the oxidizing gas is supplied to the cathode (step S210). Under the condition in which the fuel gas and the oxidizing gas are supplied to the fuel cell 30 and the load is connected to the fuel cell 30, power generation is started (step S211), and a sequence of the start-up operation ends.

[Volume of Anode Space and Volume of Cathode Space]

It is desired that hydrogen remain in the anode space and nitrogen be saturated in the cathode space when the gas supply is repeated. To achieve such a situation, it is desired that the volume of the anode space be not smaller than the volume of the cathode space. If the volume of the anode space and the volume of the cathode space are equal, consumption of oxygen and consumption of hydrogen due to cross leak are substantially balanced, and substantially all oxygen has been consumed in the operation stop state. By removing oxygen causing degradation of the electrode, degradation of the electrode due to oxidization or dissolution can be suppressed, and the cell performance can be maintained for a long time period.

To achieve such effects, it is desirable to adjust arrangement of the on-off valves, the length and cross-sectional areas of the pipes between the on-off valves, the volumes of the gas passages and others of the fuel cell 30 so that the volume of the anode space is made larger than the volume of the cathode space. In view of the fact that hydrogen is likely to leak through a seal structure or the polymer electrolyte membrane 11 in the anode space, it is desired that the volume of the anode space be not smaller than the volume of the cathode space. In view of the relationship between a dead space or the amount of retained fuel gas in the fuel cell power generating system and efficiency, it is desired that the volume of the anode space be not larger than three times as large as the volume of the cathode space.

[Features and Effects]

In accordance with the fuel cell system of the present embodiment, when the power generation is stopped, the fuel gas passage and the oxidizing gas passage are closed to form a tightly closed anode space and a tightly closed cathode space, respectively. Under a normal condition, the pressure decreases in the anode space and in the cathode space, because of gas consumption due to, for example, cross leak, or temperature decrease. In the fuel cell system of the present embodiment, the inert gas is supplied to the anode space and the air is supplied to the cathode space so that the pressure is not decreased in the anode space and in the cathode space. In the cathode space, oxygen is consumed and only nitrogen remains, and therefore the electrode potential can be suppressed to a low one. Since the gas is supplied to the interior of the fuel cell so as to make up for the pressure decrease, there is not generated a pressure difference between the interior of the fuel cell and atmosphere, making it possible to minimize the entry of oxygen into the anode space. Since the entry of oxygen is prevented, an increase in the electrode potential can be more effectively suppressed. As a result, degradation of the electrode can be surely prevented.

The prevention of the pressure decrease may lead to the prevention of damage to the polymer electrolyte membrane or electrical short between the electrodes. Since it is not necessary to supply hydrogen to the anode space and to the cathode space, it is not necessary to operate the hydrogen generator or consume hydrogen supplied from the hydrogen infrastructure during the state where the fuel cell system is not generating the electric power, enabling achievement of high energy efficiency. Since a special cylinder or the like for purging the cathode space with the inert gas may be omitted, a configuration can be advantageously simplified.

In addition, since the material gas is used as the inert gas in the fuel cell system of the present embodiment, a cylinder or the like therefor may be omitted. This effectively reduces the size of the system and improves efficiency. Since the impurities contained in the material gas are removed in the gas purifier, degradation of the electrodes due to the impurities can be prevented.

In the fuel cell system of the present embodiment, the volume of the anode space and the volume of the cathode space are set so that the reducing agent in the fuel gas is more in amount than the oxidizing agent in the oxidizing gas in the interior of the anode space and in the interior of the cathode space. With such a configuration, the reducing agent (e.g., hydrogen) reacts with the oxidizing agent (e.g., oxygen) in the interior of the fuel cell in the operation stop state. As a result, all of the oxidizing agent is consumed and the reducing agent remains in the interior of the fuel cell. Therefore, the increase in the electrode potential and degradation of the electrodes can be surely prevented.

In the fuel cell system of the present embodiment, the on-off valve 56, the on-off valve 61, the on-off valve 69, and the on-off valve 72 which are provided in the fuel gas passage and the oxidizing gas passage are able to simply and easily close the associated passages.

In the fuel cell system of the present embodiment, since the controller opens and closes the on-off valve 58 and the on-off valve 70 for supplying the inert gas and the air, respectively, the supply of the inert gas to the anode space and the supply of the oxidizing gas to the cathode space can be simply and easily controlled.

In the fuel cell system of the present embodiment, the supply of the inert gas to the anode space and the supply of the air to the cathode space can be controlled based on the pressure in the anode space or the pressure in the cathode space which has been actually detected. Furthermore, the supply of the inert gas to the anode space and the supply of the air to the cathode space can be controlled based on the pressure difference between the pressure in the anode space or the pressure in the cathode space and the pressure in the outside space. Therefore, entry of undesired air into the anode space and into the cathode space can be surely prevented.

In the fuel cell system of the present embodiment, since the first pressure and the second pressure are each set to a value which is not lower than 5 kPa and not higher than 20 kPa, the pressure difference does not become excessively large. So, a large burden is not placed on the sealing part of the system. As a result, the life of the system can be increased.

In the fuel cell system of the present embodiment, in the start-up state, the gas is guided from the interior of the anode space to the burner and is combusted in the burner. With such a configuration, the material gas supplied to the anode space is not directly released into air, and hence safety is improved. In addition, since the material gas supplied to the anode space is used to increase the temperature of the hydrogen generator, energy efficiency is increased.

Alternative Example

In the present embodiment, the supply of the inert gas and the supply of the air are controlled based on the detection results of the pressure in the anode space and the pressure in the cathode space. In some cases, the pressure in the anode space or the pressure in the cathode space can be estimated based on the time period that lapses after the stop of power generation. In those cases, the control unit 80 may calculate the time period that lapses after the stop of the power generation based on the time received from the timer 82, and control the supply of the inert gas and the supply of the air based on the calculated time period. In such a configuration, simpler control can be achieved.

Whereas in the present embodiment, the controller 49 causes the on-off valve 58 and the on-off valve 70 to be opened and closed to control the supply of the inert gas and the supply of the air, respectively, the control executed by the controller 49 is not always necessary. For example, by using check valves as the on-off valves 58 and 70 instead of the electromagnetic valves, the pressure in the anode space and the pressure in the cathode space can be kept in a predetermined range. The check valves are valves for preventing back flow and are capable of supplying the gases to the anode space and to the cathode space while preventing the outflow of the gases out of the anode space and the cathode space. To be specific, at the time point when the pressure in the anode space or in the cathode space becomes 5 kPa or larger lower than the gas supply pressure or the ambient pressure, the inert gas or the air is supplied to the anode space or to the cathode space side. A desirable configuration is that, at the time when the pressure difference becomes smaller (e.g., 0 kPa), the passages are closed. In the configuration using the check valves, since the pressure detecting means may be omitted, and the control using a computer and others may be omitted, configuration can be further simplified.

Whereas in the present embodiment, the monitoring of the pressures and the supply of the gases are stopped when the specified time period has lapsed after the start of the stop operation, the monitoring of the pressures and the supply of the gases may be executed all the time during the stand-by state. In addition, whereas in the present embodiment, the monitoring of the pressures and the supply of the gases are executed in cases where the power generation is stopped during the operation of the fuel cell system, the monitoring of the pressures and the supply of the gases may be executed during a sequence of a termination process of the operation in cases where the operation of the fuel cell system is completely terminated (power supplies of the entire control system including the controller, the sensors and others are completely tuned off).

Embodiment 2

In a fuel cell system 100 of the present embodiment, a buffer unit 90 is provided in the purified material gas bypass pipe 54 of the fuel cell system 40 of the embodiment 1 in a location between the on-off valve 58 and the fuel gas supply pipe 55. The other configuration and operation are similar to those of the fuel cell system 40 of the embodiment 1. Therefore, the same or corresponding components as those of the embodiment 1 are identified by the same reference numerals and will not be further described. Since similar effects are achieved with the operation similar to that of the embodiment 1, the operation of the present embodiment will not be further described, either. Hereinafter, characteristic configuration and effects of the present embodiment will be described.

Figure 7:
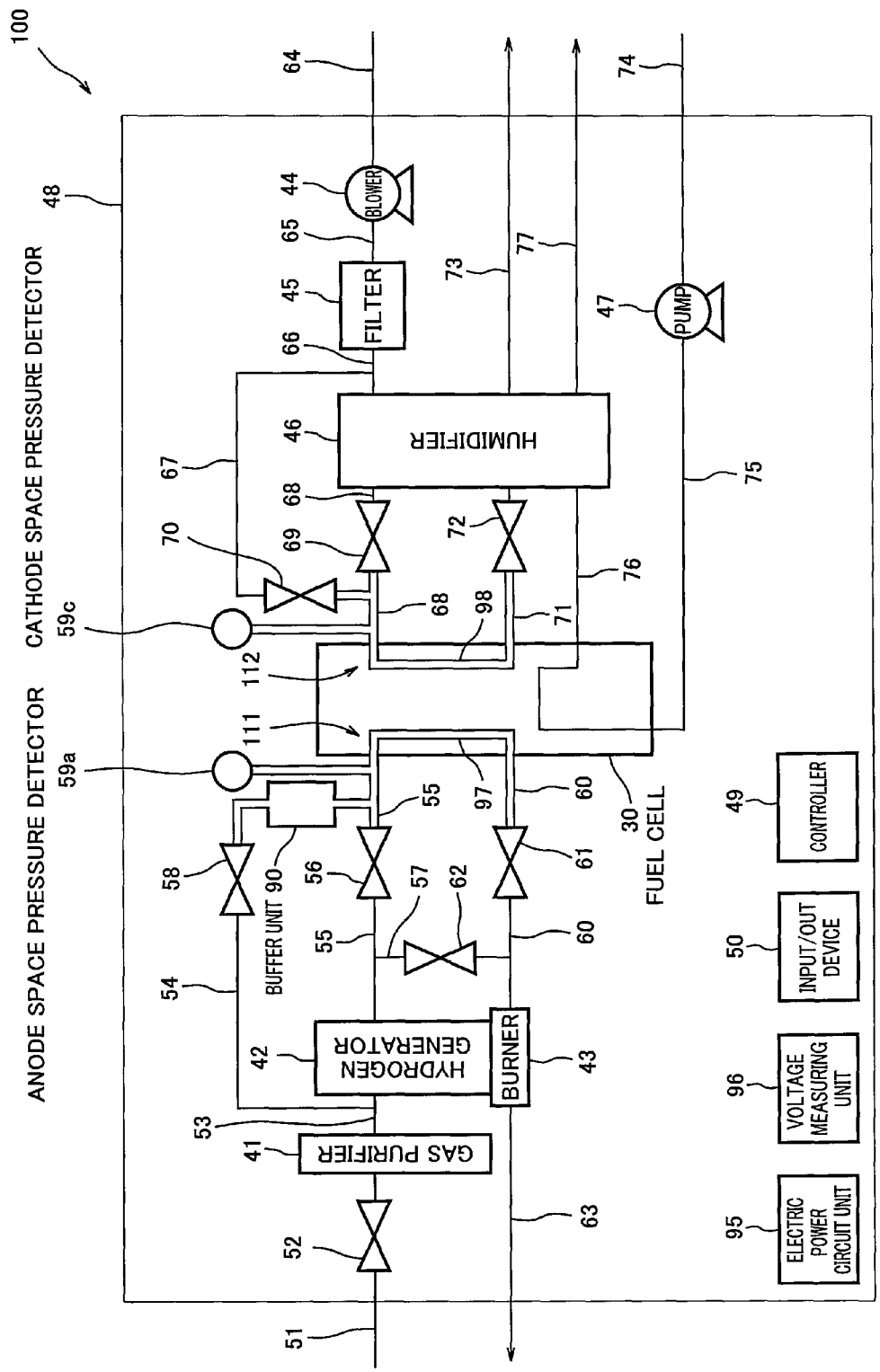
FIG. 7 is a block diagram showing an example of a schematic configuration of a hardware of a fuel cell system according to an embodiment 2 of the present invention.

FIG. 7 is a block diagram showing an example of a schematic configuration of a hardware of the fuel cell system according to the embodiment 2 of the present invention. As shown in FIG. 7, the buffer unit 90 is connected to the purified material gas bypass pipe 54 to form a part of the passage and has a cross-sectional area larger than those of the pipes to increase a volume of its internal space. The buffer unit 90 is capable of storing therein a fuel gas generated during the operation. During the state where the fuel cell system is not generating the electric power, the buffer unit 90 forms a part of the anode space 111. Therefore, the amount of the reducing agent (e.g., hydrogen) can be made sufficient in the anode space 111. By providing the buffer unit 90, the reducing agent can be easily made more in amount than the oxidizing agent in the interior of the fuel cell during the state where the fuel cell system is not generating the electric power. Therefore, decrease in the electrode potential can be surely prevented during the state where the fuel cell system is not generating the electric power, and thus degradation of the electrode can be surely prevented.

Embodiment 3

In a fuel cell system 101 of the present embodiment, a buffer unit 91 is provided in the fuel gas supply pipe 55 of the fuel cell system 40 of the embodiment 1 in a location between the on-off valve 58 and the fuel cell 30, and the purified material gas bypass pipe 54 is connected to a buffer space 67. The other configuration and operation are similar to those of the fuel cell system 40 of the embodiment 1. Therefore, the same or corresponding components as those of the embodiment 1 are identified by the same reference numerals and will not be further described. Since similar effects are achieved with the operation similar to that of the embodiment 1, the operation of the present embodiment will not be further described, either. Hereinafter, characteristic configuration and effects of the present embodiment will be described.

Figure 8:
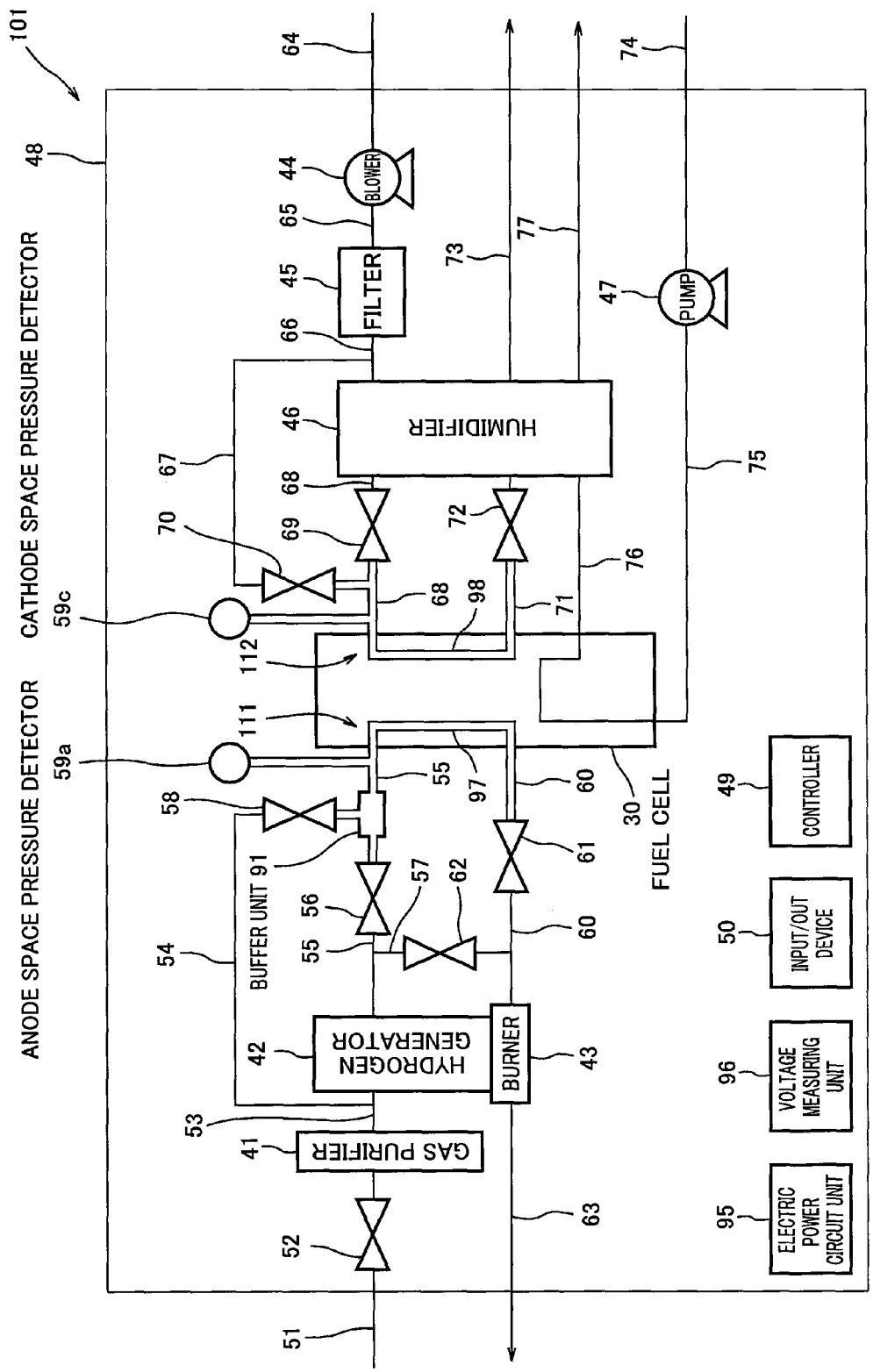
FIG. 8 is a block diagram showing an example of a schematic configuration of a hardware of a fuel cell system according to an embodiment 3 of the present invention.

FIG. 8 is a block diagram showing an example of a schematic configuration of a hardware of the fuel cell system according to the embodiment 3 of the present invention. As shown in FIG. 8, the buffer unit 91 is connected to the fuel gas supply pipe 55 to form a part of the passage and has a cross-sectional area larger than those of the pipes to increase a volume of its internal space. The buffer unit 91 is capable of storing therein a fuel gas generated during the operation. During the state where the fuel cell system is not generating electric power, the buffer unit 91 forms a part of the anode space 111. Therefore, the amount of the reducing agent (e.g., hydrogen) can be made sufficient in the anode space 111. By providing the buffer unit 91, the reducing agent can be easily made more in amount than the oxidizing agent in the interior of the fuel cell. Therefore, decrease in the electrode potential can be surely prevented during the state where the fuel cell system is not generating the electric power, and thus degradation of the electrodes can be surely prevented.

Embodiment 4

In a fuel cell system 102 of the present embodiment, a buffer unit 92 is provided in the interior of the fuel cell 30 of the fuel cell system 40 of the embodiment 1. The other configuration and operation are similar to those of the fuel cell system 40 of the embodiment 1. Therefore, the same or corresponding components as those of the embodiment 1 are identified by the same reference numerals and will not be further described. Since similar effects are achieved with the operation similar to that of the embodiment 1, the operation of the present embodiment will not be further described, either. Hereinafter, characteristic configuration and effects of the present embodiment will be described.

Figure 9:
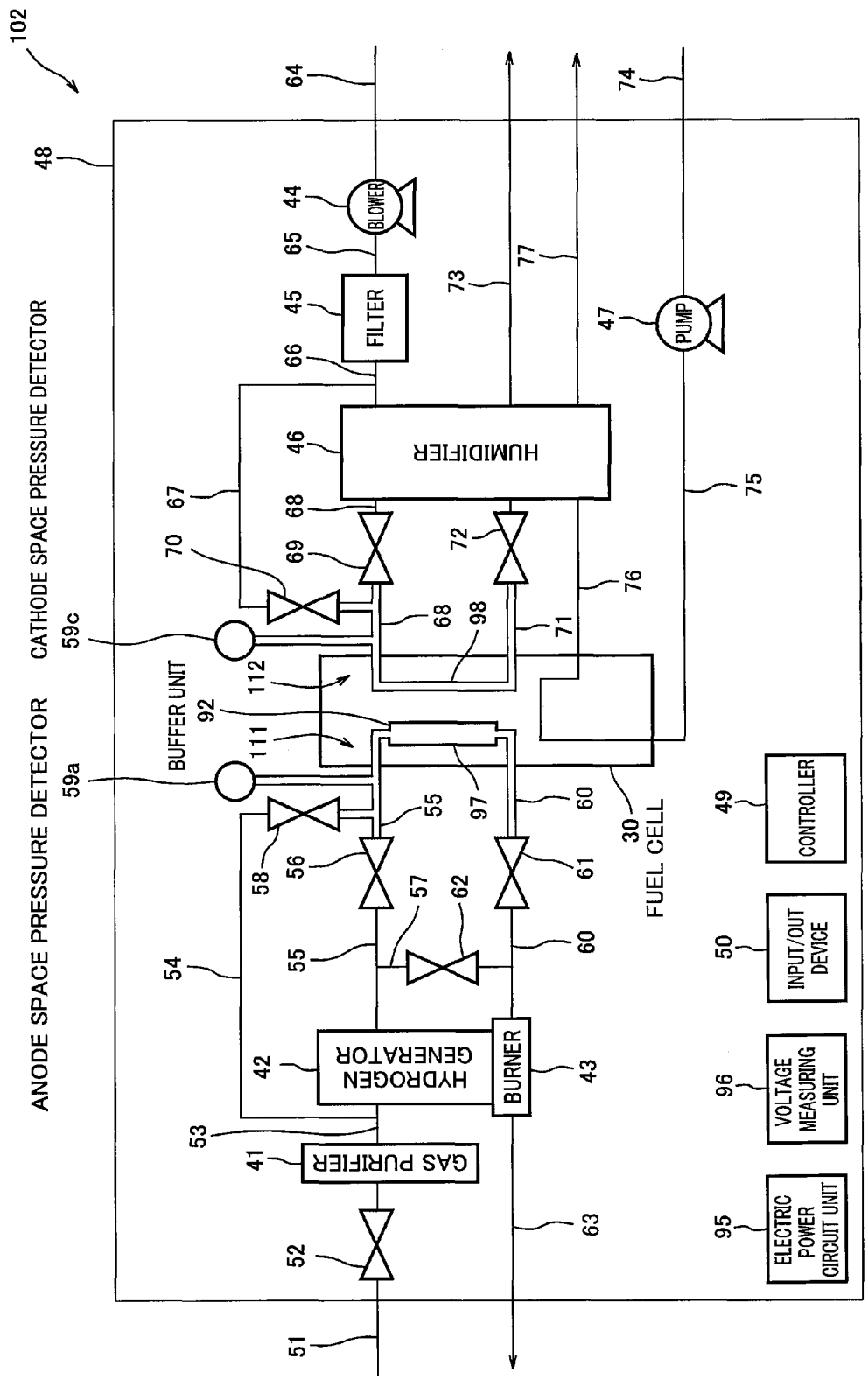
FIG. 9 is a block diagram showing an example of a schematic configuration of a hardware of a fuel cell system according to an embodiment 4 of the present invention.

FIG. 9 is a block diagram showing an example of a schematic configuration of a hardware of the fuel cell system according to the embodiment 4 of the present invention. As shown in FIG. 9, the buffer unit 92 is connected to the fuel gas passage in the interior of the fuel cell 30 to form a part of the passage. The location of the buffer unit 92 in the interior of the fuel cell 30 is not particularly limited. Nonetheless, in order to save a space, it is desirable to increase a diameter of a through-gas passage (manifold) present in a direction in which layers are stacked in the fuel cell 30. The buffer unit 92 is capable of storing therein a fuel gas generated during the operation. During the state where the fuel cell system is not generating the electric power, the buffer unit 92 forms a part of the anode space 111. Therefore, the amount of the reducing agent (e.g., hydrogen) can be made sufficient in the anode space 111. By providing the buffer unit 92, the reducing agent can be easily made more in amount than the oxidizing agent in the interior of the fuel cell. Therefore, decrease in the electrode potential can be surely prevented during the state where the fuel cell system is not generating the electric power, and thus degradation of the electrodes can be surely prevented.

Embodiment 5

In a fuel cell system 103 of the present embodiment, the purified oxidizing gas bypass pipe 67 in the fuel cell system 40 of the embodiment 1 is replaced by an air supply pipe 93. The other configuration and operation are similar to those of the fuel cell system 40 of the embodiment 1. Therefore, the same or corresponding components as those of the embodiment 1 are identified by the same reference numerals and will not be further described. Since similar effects are achieved with the operation similar to that of the embodiment 1, the operation of the present embodiment will not be further described, either. Hereinafter, characteristic configuration and effects of the present embodiment will be described.

Figure 10:
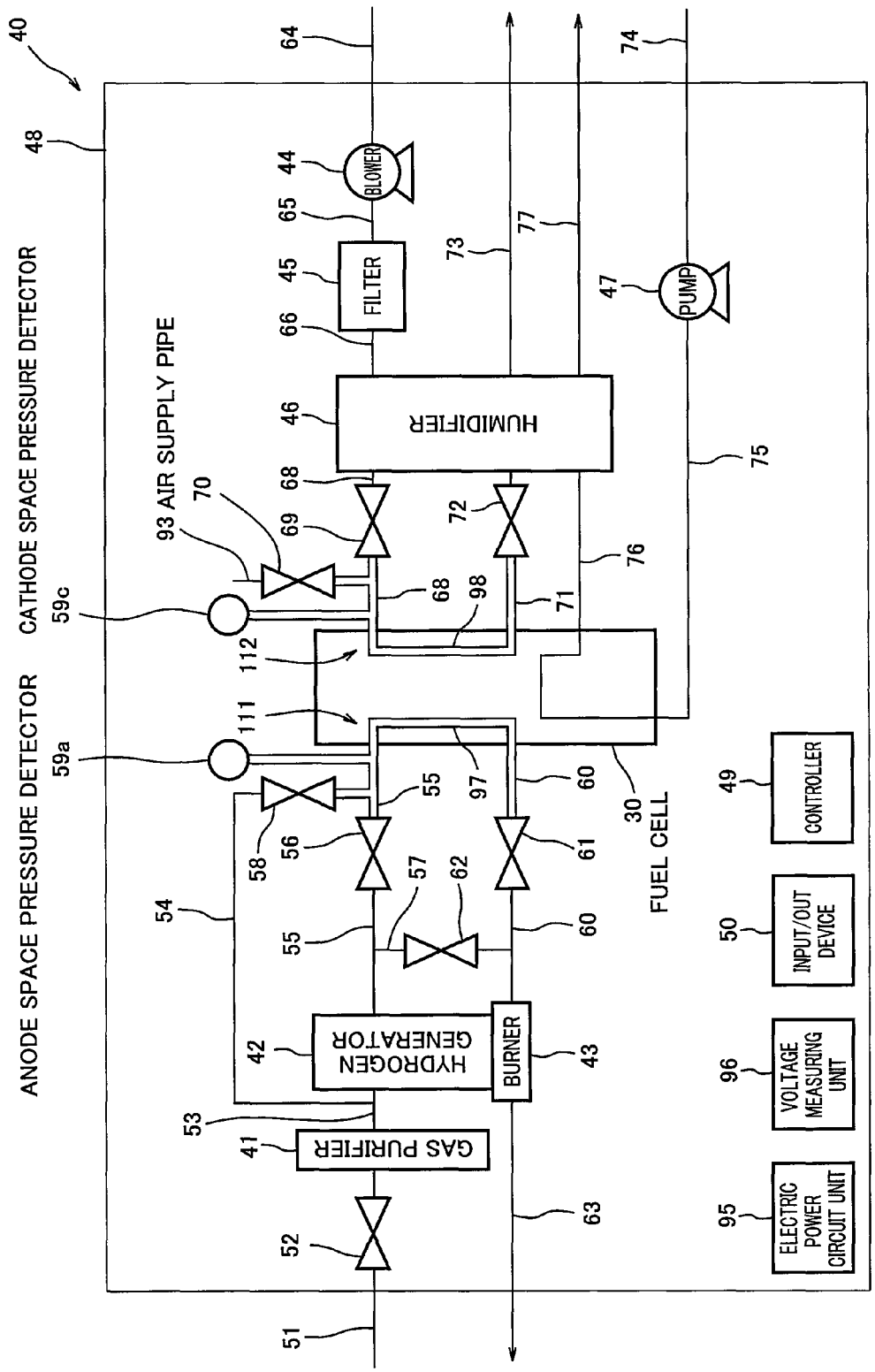
FIG. 10 is a block diagram showing an example of a schematic configuration of a hardware of a fuel cell system according to an embodiment 5 of the present invention.

FIG. 10 is a block diagram showing an example of a schematic configuration of a hardware of the fuel cell system according to the embodiment 5 of the present invention. As shown in FIG. 10, the air supply pipe 93 has one end that opens in atmosphere and an opposite end that is connected to the humidified oxidizing gas supply pipe 68 in a location between the on-off valve 69 and the fuel cell 30. An on-off valve 70 is provided in the air supply pipe 93. By opening the on-off valve 70, air is supplied from the air supply pipe 93 to the cathode space 112. With such a configuration, an intake pressure loss of the air supplied to the cathode space 112 is made small. Even when the cathode space 112 has a negative pressure, the pressure is restored as soon as the on-off valve 70 is opened. Therefore, physical damage to the polymer electrolyte membrane 11 can be reduced.

Embodiment 6

In a fuel cell system 104 of the present embodiment, the cathode space pressure detector 59c and the anode space pressure detector 59a of the fuel cell system 40 of the embodiment 1 are replaced by a temperature detector 94. The other configuration and operation are similar to those of the fuel cell system 40 of the embodiment 1. Therefore, the same or corresponding components as those of the embodiment 1 are identified by the same reference numerals and will not be further described. Since similar effects are achieved with the start-up operation similar to that of the embodiment 1, the start-up operation of the present embodiment will not be further described, either. Hereinafter, characteristic configuration, stop operation and effects of the present embodiment will be described.

Figure 11:
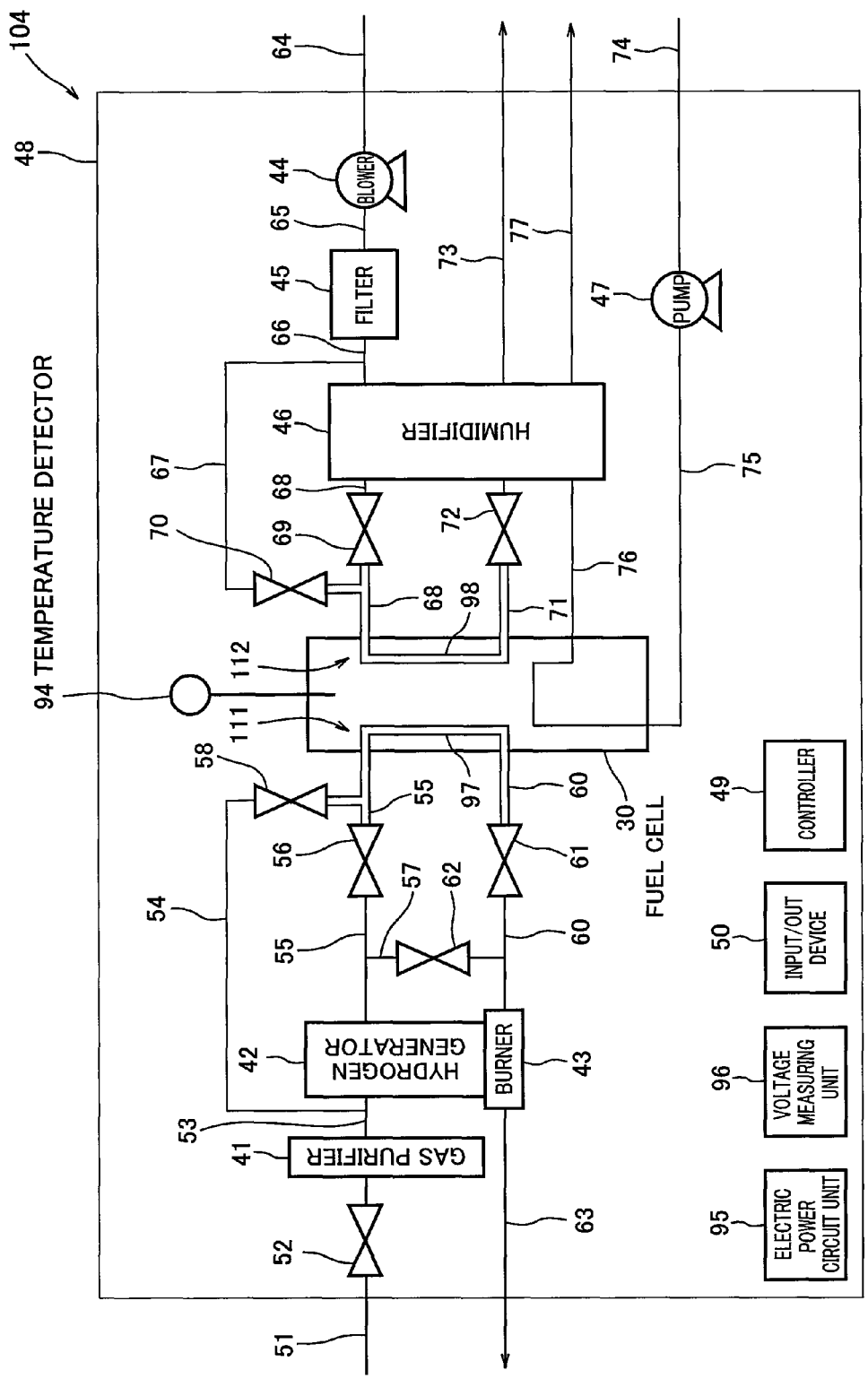
FIG. 11 is a block diagram showing an example of a schematic configuration of a hardware of a fuel cell system according to an embodiment 6 of the present invention.

FIG. 11 is a block diagram showing an example of a schematic configuration of a hardware of the fuel cell system according to the embodiment 6 of the present invention. As shown in FIG. 11, the temperature detector 94 detects a surface temperature of the fuel cell 30 and sends a detection result to the controller 49. In the present embodiment, based on the surface temperature of the fuel cell 30, the supply of the inert gas to the anode space 111 and the supply of the air to the cathode space 112 are controlled. The temperature detector 94 may be any detector so long as it is capable of directly or indirectly detecting the temperature of the gas in the interior of the anode space 111 and the temperature of the gas in the interior of the cathode space 112, and its attachment location is not limited. For example, the temperature detector 94 may be configured to detect the temperature in the interior of the fuel cell 30 (stack). The temperature detector 94 may be attached on the hydrogen generator 42 so that a pressure change in the anode space 111 and a pressure change in the cathode space 112 are estimated indirectly from the temperature of the hydrogen generator 42.

In the present embodiment, the relationship between the surface temperature of the fuel cell 30 and the pressure change in the anode space 111 and the pressure change in the cathode space 112 is obtained in advance through an experiment using a tester machine having the same system configuration. With the same system configuration, the relationship between the temperature and the pressure is substantially the same. In the experiment, the temperature at the time point when the pressure in the anode space 111 and the pressure in the cathode space 112 reach limit pressures (e.g., pressure difference between the ambient pressure and the limit pressures is 5 kPa) which do not place substantial burden on the sealing part and the like is recorded, and at that time point, the on-off valve 58 and the on-off valve 70 are opened, so that the supply of the inert gas to the anode space 111 and the supply of the air to the cathode space 112 are started. When the pressure in the anode space 111 becomes substantially equal to the supply pressure of the inert gas, the on-off valve 58 is closed to stop supply of the inert gas. And, a time period (inert gas supply time period e.g., 10 sec) that lapses after the start of the supply of the inert gas is stored. When the pressure in the cathode space 112 becomes substantially equal to the ambient pressure (atmospheric pressure), the on-off valve 70 is closed to stop the supply of the air. And, a time period (air supply time period: e.g., 15 sec) after the start of the supply of air is stored. When the pressure in the anode space 111 and the pressure in the cathode space 112 reach the limit pressures which do not place a burden on the sealing part and the like again, the temperature at that time point is stored, and the on-off valve 58 and the on-off valve 70 are opened, so that the supply of the inert gas to the anode space 111 and the supply of the air to the cathode space 112 are started. Such an operation is repeated and the temperature at which the gas supply is carried out is recorded until the temperature decreases and is stabilized.

The control is executed based on the experimental result so that the inert gas is supplied to the anode space only during the inert gas supply time period and the air is supplied to the cathode space only during the air supply time period at the time point when the temperature reaches the recorded temperature. Such an operation makes it possible to maintain the pressure in the anode space and the pressure in the cathode space in a range where a substantial burden is not placed on the sealing part and others even in the configuration in which the pressures are not actually detected. Hereinafter, it is assumed that the recorded temperatures are 65° C., 60° C., 55° C., . . . which decease on 5° C. basis from the operation temperature (e.g., 70° C.). Alternatively, change in the temperature and pressure in the interior of the anode space and change in the temperature and pressure in the interior of the cathode space may be calculated according to theoretical formulae. The gases may be supplied every time the temperature decreases by a first temperature. The first temperature is preferably not lower than 5° C. and not higher than 20° C. in view of a theoretical relationship between the temperature and the pressure, stiffness of the sealing part, etc.

Figure 12:
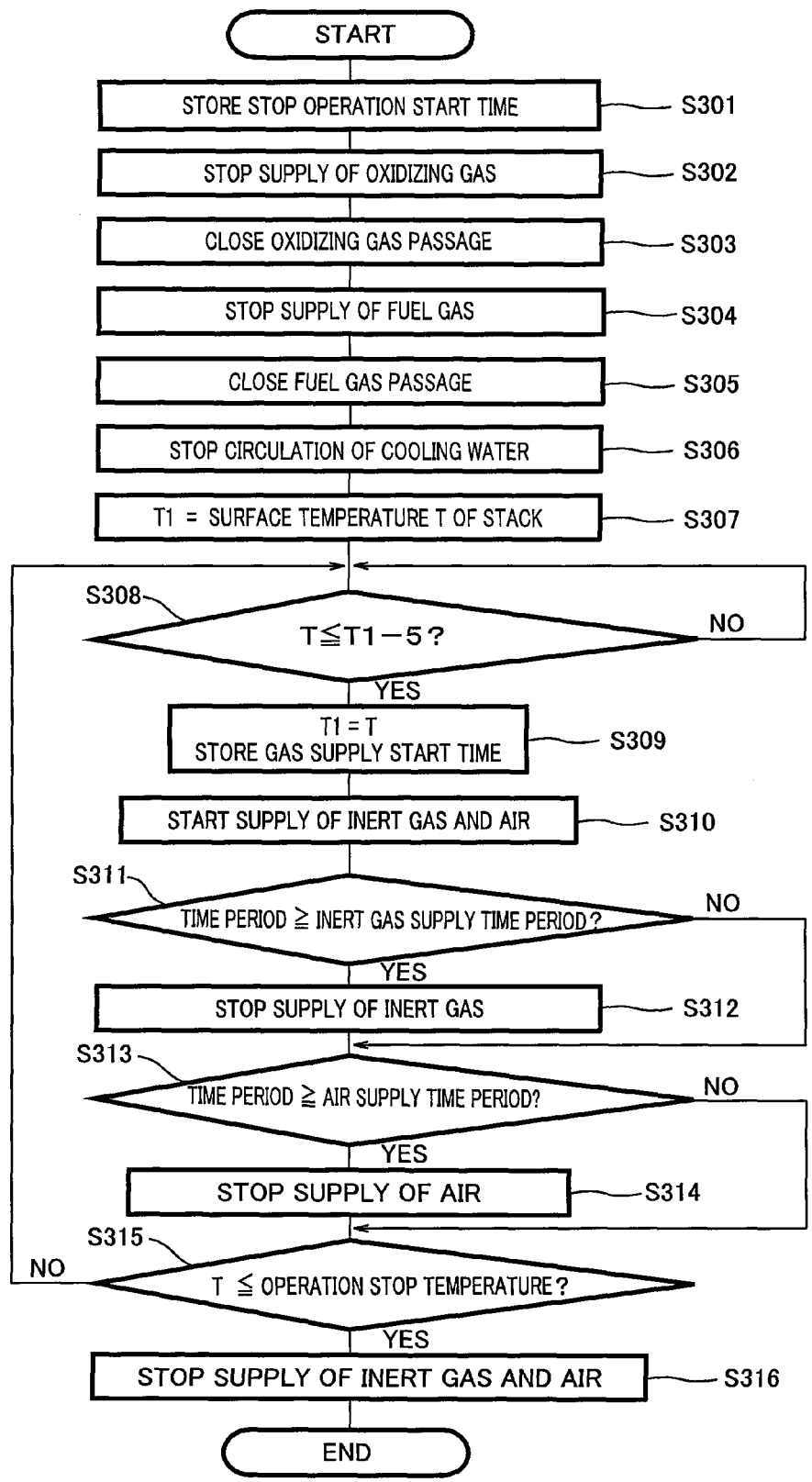
FIG. 12 is a flowchart showing a stop operation of the fuel cell system according to the embodiment 6 of the present invention.

FIG. 12 is a flowchart showing a stop operation of the fuel cell system according to the embodiment 6 of the present invention. With reference to FIG. 12, the stop operation of the fuel cell system of the present invention will be described.

As in the embodiment 1, the controller 49 starts the stop operation (start) when it determines that the power generation in the fuel cell 30 should be stopped. When the stop operation is started, a first stop step is initially performed. The first stop step is identical to that of the embodiment 1 and therefore will not be further described. When the first stop step is terminated, a second stop step is started.

In the second stop step, the supply of the fuel gas and the supply of the oxidizing gas are in a stopped state, the temperature of the fuel cell 30 decrease, and the pressure in the anode space and the pressure in the cathode space decrease. The main cause of the pressure decrease is that cross leak via the polymer electrolyte membrane 11 occurs and causes hydrogen and oxygen to be consumed through the reaction, and steam is condensed due to the temperature decrease. The controller 49 causes the temperature detector 94 to detect the surface temperature of the fuel cell 30. A surface temperature T of the fuel cell 30 is stored as T1 (step S307). It is determined whether or not the surface temperature T is 5° C. or more lower than T1 (step S308). If it is determined YES in step S308, the controller 49 updates T1 to the surface temperature T, receives a current time from the timer 82, and stores it as a gas supply start time (step S309). The on-off valve 58 and the on-off valve 70 are opened, so that the material gas (inert gas) which has been purified in the gas purifier 41 is supplied to the anode space 111 through the purified material gas bypass pipe 54 and the oxidizing gas (air) which has been purified in the filter 45 is supplied to the cathode space 112 through the purified oxidizing gas bypass pipe 67 (step S310). The time period that lapses from the start of the gas supply is calculated from the gas supply start time stored in step S309 and the current time received from the timer 82 in step S309. If the time period is longer than the inert gas supply time period, the on-off valve 58 is closed to stop the supply of the inert gas (step S311 to step S312). If the time period is longer than the air supply time period, the on-off valve 70 is closed to stop supply of the air (step S313 to step S314). It is determined whether or not the stack surface temperature T is not higher than the operation stop temperature (e.g., 30° C.) (step S315). If it is determined YES in step S315, the supply of the inert gas and the supply of the air are stopped (step S316), and the operation is stopped (end). On the other hand, if it is determined NO in step S315, the process returns to step S308.

During the second stop step, the gas supply is performed repeatedly every time the surface temperature of the fuel cell 30 decreases by the predetermined temperature (first temperature). As a result of such an operation, a concentration of hydrogen in the fuel gas decreases and hydrogen and the purified material gas finally fills in the anode space 111. Air gradually flows into the cathode space 112. But, oxygen in the air is consumed through a reaction with hydrogen because of occurrence of cross-leaks. Finally, nitrogen substantially fills in the cathode space 112. Such an operation makes it possible to prevent damage to the components of the fuel cell 30 or the entry of oxygen into the fuel cell, which may be caused by the pressure change. As a result, the life of the fuel cell system is improved. In the present embodiment, in particular, since the control is executed based on the temperature of the anode space 111 or the temperature of the cathode space 112, detection of the pressures may be omitted, and the configuration of the system can be simplified. Furthermore, the gases are supplied every time the temperature of the anode space 111 and the temperature of the cathode space 112 decrease by the predetermined temperature (e.g., 5° C.), the control becomes easier.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The fuel cell system of the present embodiment is useful as a fuel cell system which is capable of achieving high energy efficiency and is capable of surely preventing degradation of electrodes during a state where the fuel cell system is not generating an electric power, even when the fuel cell system repeats start-up and stop.

The invention claimed is:

1. A fuel cell system comprising:
a fuel cell including a polymer electrolyte membrane, and an anode and a cathode which sandwich the polymer electrolyte membrane;
a fuel gas passage through which a fuel gas is supplied to the anode and is discharged from the anode;
an oxidizing gas passage through which an oxidizing gas is supplied to the cathode and is discharged from the cathode;
an anode space including said fuel gas passage and a space connected to said fuel gas passage;
a cathode space including said oxidizing gas passage and a space connected to said oxidizing gas passage;
an inert gas supply device connected to the anode space which supplies an inert gas to said fuel gas passage;
an air supply device connected to the cathode space which supplies air to said oxidizing gas passage; and
a closing device which closes said anode space and said cathode space;
wherein said closing device is configured to close said anode space and said cathode space during a state where said fuel cell system is not generating an electric power;
wherein said inert gas supply device is configured to supply the inert gas to the closed anode space which is substantially isolated from outside, when the closed anode space reduces in pressure during the state where said fuel cell system is not generating the electric power;
wherein said air supply device is configured to supply the air to the closed cathode space which is substantially isolated from outside, when the closed cathode space reduces in pressure during the state where said fuel cell system is not generating the electric power, and
wherein the anode space has a volume larger than a volume of the cathode space.

2. The fuel cell system according to claim 1, further comprising:
a gas purifier which purifies a material gas; and
a hydrogen generator which generates the fuel gas from the material gas;
wherein the inert gas is the material gas which has been purified in said gas purifier.

3. The fuel cell system according to claim 1, wherein the anode space and the cathode space respectively have volumes set so that a reducing agent is more in amount than an oxidizing agent in the anode space and the cathode space, under a condition in which temperature of said fuel cell system is stabilized after power generation is stopped.

4. The fuel cell system according to claim 1, wherein the anode space has a volume which is not smaller than a volume of the cathode space and is not larger than three times as large as the volume of the cathode space.

5. The fuel cell system according to claim 1, further comprising:
a buffer unit provided in the anode space.

6. The fuel cell system according to claim 1, further comprising:
a controller; wherein the closing device comprises:
a first on-off valve which is provided to be able to open and close a supply side of said fuel gas passage;
a second on-off valve which is provided to be able to open and close a discharge side of said fuel gas passage;
a third on-off valve which is provided to be able to open and close a supply side of said oxidizing gas passage; and
a fourth on-off valve which is provided to be able to open and close a discharge side of said oxidizing gas passage;

wherein said controller is configured to cause said first on-off valve and said second on-off valve to be closed to close said fuel gas passage during the state where said fuel cell system is not generating the electric power; and wherein said controller is configured to cause said third on-off valve and said fourth on-off valve to be closed to close said oxidizing gas passage during the state where said fuel cell system is not generating the electric power.

7. The fuel cell system according to claim 1, further comprising:

a controller;

wherein said inert gas supply device includes a fifth on-off valve;

wherein said air supply device includes a sixth on-off valve;

wherein said controller is configured to cause said fifth on-off valve to be opened and closed to control supply of the inert gas to the anode space during the state where said fuel cell system is not generating the electric power; and wherein said controller is configured to cause said sixth on-off valve to be opened and closed to control supply of the air to the cathode space during the state where said fuel cell system is not generating the electric power.

8. The fuel cell system according to claim 1, further comprising:

a controller; and a pressure detector configured to directly or indirectly detect a pressure in the anode space or a pressure in the cathode space;

wherein said controller is configured to control supply of the inert gas from said inert gas supply device to the anode space and supply of the air from said air supply device to the cathode space, based on a detection result of said pressure detector, during the state where said fuel cell system is not generating the electric power.

9. The fuel cell system according to claim 7, wherein said controller is configured to control said inert gas supply device to supply the inert gas to the anode space until an anode space pressure which is a pressure in an interior of the anode space substantially becomes equal to a supply pressure of the inert gas, when the anode space pressure is a first pressure or more lower than supply pressure of the inert gas; and wherein said controller is configured to control said air supply device to supply the air to the cathode space until a cathode space pressure which is a pressure in an interior of the cathode space substantially becomes equal to an ambient pressure, when the cathode space pressure is a second pressure or more lower than the ambient pressure.

10. The fuel cell system according to claim 7, wherein said controller is configured to control said inert gas supply device to supply the inert gas to the anode space until an anode space pressure which is a pressure in an interior of the anode space substantially becomes equal to a supply pressure of the inert gas, when the anode space pressure is a first pressure or more lower than an ambient pressure; and wherein said controller is configured to control said air supply device to supply the air to the cathode space until a cathode space pressure which is a pressure in an interior of the cathode space substantially becomes equal to an ambient pressure, when the cathode space pressure is a second pressure or more lower than the ambient pressure.

11. The fuel cell system according to claim 7, wherein said controller is configured to control said inert gas supply device to supply the inert gas to the anode space until an anode space pressure which is a pressure in an interior of the anode space substantially becomes equal to a supply pressure of the inert gas, when the anode space pressure is a first pressure or more lower than a standard atmospheric pressure; and wherein said controller is configured to control said air supply device to supply the air to the cathode space until a cathode space pressure which is a pressure in an interior of the cathode space substantially becomes equal to an ambient pressure, when the cathode space pressure is a second pressure or more lower than the standard atmospheric pressure.

12. The fuel cell system according to claim 8, wherein the first pressure and the second pressure are each set to a value not lower than 5 kPa and not higher than 20 kPa.

13. The fuel cell system according to claim 1, further comprising:

a controller; and a temperature detector which directly or indirectly detects a temperature of the anode space or a temperature of the cathode space;

wherein said controller is configured to control supply of the inert gas to the anode space and supply of the air to the cathode space, based on a detection result of said temperature detector, during the state where said fuel cell system is not generating the electric power.

14. The fuel cell system according to claim 10, wherein said controller is configured to control said inert gas supply device to supply the inert gas to the anode space and to control said air supply device to supply the air to the cathode space, every time the detection result of the said temperature detector decreases by a first temperature difference;

and wherein the first temperature difference is not smaller than 5° C. and not larger than 20° C.

15. The fuel cell system according to claim 1, further comprising:

a controller; and a timer which measures a time period that lapses after power generation is stopped;

wherein said controller is configured to control supply of the inert gas to the anode space and supply of the air to the cathode space, based on a measurement result of said timer, after power generation is stopped.

16. The fuel cell system according to claim 2, wherein said hydrogen generator includes a burner;

and wherein said hydrogen generator is configured such that said burner combusts a gas guided from an interior of the anode space to said burner in a start-up state.

* * * * *